US012806531B1

(12) United States Patent
Mulligan et al.

(10) Patent No.: US 12,806,531 B1
(45) Date of Patent: *Nov. 24, 2026

(54) SINGLE-CLICK INTERFACE FOR COLLABORATION WITH GENERATIVE ARTIFICIAL INTELLIGENCE

(71) Applicant: Liminal Experiences, Inc., Santa Monica, CA (US)

(72) Inventors: Brendan Mulligan, Los Angeles, CA (US); David Lieberman, Portland, OR (US); Jean-Eric Khalife, Culver City, CA (US); Isaac Karth, Berkeley, CA (US); Stefan Dorsett, San Jose, CA (US)

(73) Assignee: Liminal Experiences, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/319,467

(22) Filed: Sep. 4, 2025

Related U.S. Application Data

(63) Continuation of application No. 19/282,933, filed on Jul. 28, 2025.

(51) Int. Cl.
*A63F 13/69* (2014.01)
*A63F 13/52* (2014.01)

(52) U.S. Cl.
CPC .............. *A63F 13/69* (2014.09); *A63F 13/52* (2014.09)

(58) Field of Classification Search
CPC ........................................................ A63F 13/69
See application file for complete search history.

(56) References Cited

U.S. PATENT DOCUMENTS 11,083,958 B2 * 8/2021 Bucher et al. .......... A63F 13/25
11,501,480 B2 * 11/2022 McIntyre-Kirwin et al. ............... G06T 13/40
2003/0048092 A1 * 3/2003 Chu .......................... G06F 9/44
2008/0081701 A1 * 4/2008 Shuster ..................... A63F 9/24
2020/0306640 A1 * 10/2020 Kolen et al. .......... A63F 13/655
2022/0119810 A1 * 4/2022 Peters et al. ............ A63F 13/00
2025/0078453 A1 * 3/2025 Sarace et al. ........ G06V 10/761

OTHER PUBLICATIONS

ChatGPT, “ChatGPT Chatbot”, Available online at: <https://chatgpt.com/>, Retrieved on Oct. 9, 2025, 1 page.

(Continued)

*Primary Examiner* — James J Debrow
(74) *Attorney, Agent, or Firm* — Shook, Hardy & Bacon L.L.P.

(57) ABSTRACT

Some aspects relate to technologies for a single-click interface for collaboration with generative artificial intelligence. In accordance with some aspects, input selecting a region of a screen view of an application is interpreted as intent to modify an element of the application based on the region. Responsive to the input selecting the region, local contextual data corresponding to the region is accessed, and global contextual data corresponding to the application is accessed. A prompt is applied to a generative language model with the local contextual data, the global contextual data, and instructions to generate a modification to the element of the application. The modification is then applied to the element of the application and displayed to the user.

20 Claims, 16 Drawing Sheets

(56) References Cited

OTHER PUBLICATIONS

GITHUB, “GitHub Copilot”, Available online at: <https://github.com/features/copilot>, Retrieved on Oct. 9, 2025, 12 pages.

Midjourney, “Editor”, Available online at: <https://docs.midjourney.com/hc/en-us/articles/32764383466893-Editor>, Retrieved on Oct. 9, 2025, 7 pages.

* cited by examiner

500H

SINGLE-CLICK INTERFACE FOR COLLABORATION WITH GENERATIVE ARTIFICIAL INTELLIGENCE

CROSS-REFERENCE TO RELATED APPLICATIONS

This application is a continuation of U.S. patent application Ser. No. 19/282,933 filed Jul. 28, 2025, entitled "SINGLE-CLICK INTERFACE FOR COLLABORATION WITH GENERATIVE ARTIFICIAL INTELLIGENCE" which is incorporated herein by reference in its entirety.

TECHNICAL FIELD

Aspects hereof relate to an interface for collaboration with generative artificial intelligence (AI).

BACKGROUND

Video game development is a manual, labor-intensive process requiring developers to create and configure each individual element of the video game, such as environments, characters, levels, and gameplay mechanics. The manual design process involves extensive coordination between development teams in order to ensure consistency across the gaming environment. For example, teams may conceptualize gameplay mechanics, rules, and level structures to write code to implement game logic and system behaviors, while other teams may manually model characters, environments and objects using digital tools and manually place game elements, such as non-player characters (NPCs) or other interactive objects and dialogue events within the game world. As a result, the manual design process becomes exceptionally time-consuming and computationally expensive.

SUMMARY

Aspects hereof describe system and methods for a single-click interface for collaboration with generative AI. In certain aspects, input selecting a region of a screen view of an application is interpreted as intent to modify an element of the application based on the region of the screen view. Responsive to the input selecting the region, local contextual data corresponding to the region is accessed and global contextual data corresponding to the application is accessed. A prompt is applied to a generative language model with the local contextual data, the global contextual data, and instructions to generate a modification to the element of the application. The modification is then applied to the element of the application and displayed to the user.

In one aspect, non-transitory computer storage media stores executable instructions that, when executed by one or more processors, cause the one or more processors to perform a method that includes, responsive to input selecting a region of a screen view of an application, modifying an element of the application based on the region by (1) applying a prompt to a generative language model that includes local contextual data based on the region of the screen view, global contextual data based on the application and instructions to generate a representation of a modification to the region and (2) applying the modification to the element of the application. The executable instruction may also include causing display of the screen view with the modification to the element of the application.

In one aspect, non-transitory computer storage media stores executable instructions that, when executed by one or more processors, cause the one or more processors to perform a method that includes interpreting input selecting a region of a screen view of a gaming environment as intent to modify an element of the gaming environment based on the region of the screen view. The executable instruction may also include, responsive to the input, modifying the element of the gaming environment by accessing local contextual data based on the region of the screen view, accessing global contextual data based on the gaming environment, applying a prompt to a generative language model with the local contextual data, the global contextual data, and instructions to generate a representation of a modification to the element of the gaming environment, and applying the modification to the element of the gaming environment. The executable instruction may also include causing display of the screen view of the gaming environment with the modification to the element of the gaming environment.

Some aspects are directed to a system that includes one or more processors and non-transitory computer storage media storing executable instructions that when executed by the one or more processors cause the one or more processors to perform a method. The method includes, responsive to receiving a single modifier-click action selecting a region of a screen view of an application, modifying an element of the application based on the region of the screen view by: accessing local contextual data based on the region of the screen view, accessing global contextual data based on the application, applying a prompt to a generative language model with the local contextual data, the global contextual data and instructions to generate a modification to the element of the application, and applying the modification to the element of the application; and causing display of the screen view with the modification to the element of the application.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
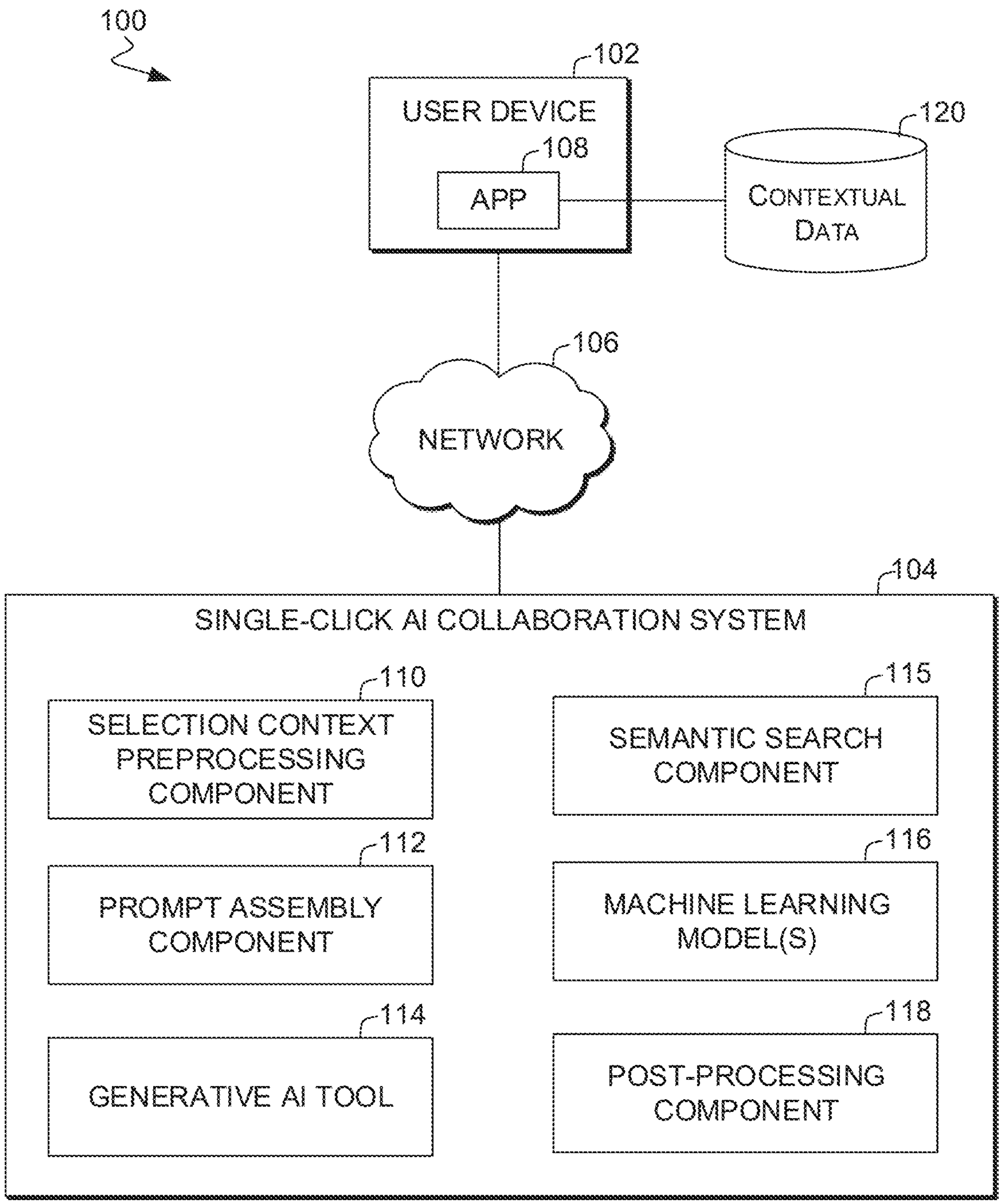
FIG. 1 is a block diagram illustrating an exemplary system, in accordance with aspects hereof.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

As described above, video game development is a manual, labor-intensive process requiring developers to create and configure each individual element of the video game, such as environments, characters, levels, and gameplay mechanics. The manual design process involves extensive coordination between development teams in order to ensure consistency across the gaming environment. Additionally, the manual design process often involves repetitive tasks, such as the creation of a number of different NPCs and other elements of the gaming environment. The reliance on human input across multiple development teams increases the risk of inconsistency and error and increases the computing resources and time required to develop the video game. Further, as each individual element of the video game must be manually designed, it is difficult to quickly adapt changes globally throughout a gaming environment, such as changes based on user feedback or shifting market demands.

Aspects of the technology described herein provide an improved approach to interaction with generative AI tools, such as when collaborating with generative AI tools in video game development, which addresses the technical shortcomings of existing approaches. In accordance with some aspects, embodiments described herein include single-click interface to automate collaboration with a generative AI tool, such as a multimodal generative language model. In various embodiments, the single-click interface initiates Retrieval-Augmented Generation (RAG) prompt engineering to collaborate with the generative AI tool by constructing a prompt based on (1) local contextual data corresponding to the region of the screen view that was selected and (2) global contextual data corresponding to global aspects of the application (e.g., external to the particular region of the screen view of the application), such as the entire adventure of the gaming environment. By utilizing local contextual data corresponding to the region of the screen view that was selected, the generative AI tool can determine what the user desires to modify based on the particular region of the screen view. By utilizing global contextual data corresponding to global aspects of the application outside the particular region of the screen view of the application, the generative AI tool can ensure that modification to elements of the application generated by the generative AI tool is consistent across the application.

For example, a developer is developing a gaming environment via a game development environment. For instance, the gaming environment can be a persistent world (such as those of massive multiplayer online role-playing games [MMORPG]), a session-based instance in a persistent world (such as a raid, player-versus-player arena, or player-versus-environment arena in an MMORPG), or a session-specific instance of a world (such as a battle royale map, real-time strategy map, first-person shooter [FPS] map, fighting game level, multiplayer online battle arena [MOBA] map, or similar maps). Examples of screen views 500A-500H of a game development environment of a gaming environment in which developers can interact with elements of the gaming environment are shown in FIGS. 5A-5H.

The developer selects a region of a screen view of a game development environment, such as a user interface (UI) element or a particular area of pixels of the gaming environment, via a single-click, such as a single modifier-click action (e.g., CTRL+click action). The single-click is automatically interpreted as intent to modify aspects of the gaming environment based on the region of the screen view of the gaming environment using a generative AI tool. In this regard, local contextual data corresponding to the region of the screen view of the gaming environment is accessed. For example, local contextual data can indicate that the particular UI element corresponds to a description of an NPC. As another example, local contextual data (e.g., text, images, video, and/or the like) indicating that the particular region of pixels corresponds to an area of the gaming environment is accessed. Further, global contextual data (e.g., text, images, video, and/or the like) for the gaming environment external to the particular region of the screen view is accessed. For example, global contextual data corresponding to each of the NPC’s dialogue throughout the game is accessed. As another example, global contextual data corresponding to the game state (e.g., the current snapshot of game elements, such as the current state of the adventure of the gaming environment) of the screen view of the gaming environment is accessed. A prompt with the local contextual data, global contextual data, and instructions to generate a modification to elements of the gaming environment based on the region of the gaming environment is applied to the generative AI tool. The output of the generative AI tool is validated and applied to the gaming environment in response to the single-click by the user.

Aspects of the technology described herein provide a number of improvements over existing interfaces for collaborating with generative AI tools, such as when collaborating with generative AI tools in video game development. For instance, a single-click interface that automates collaboration with a generative AI tool by leveraging both local and global contextual data to generate targeted modifications for an application significantly enhances computational efficiency by reducing the need for users to manually gather, interpret, and apply context each time output is desired from a generative AI tool. Instead of requiring users to manually gather, interpret, and apply context each time output is desired from a generative AI tool, the single-click interface automatically assembles a context-rich RAG-based prompt by retrieving relevant local contextual data (e.g., corresponding to specific UI elements or game objects) based on the user’s intent and global contextual data (e.g., corresponding to overarching narrative or system-wide parameters) to optimize the output of the generative AI tool. By grounding the prompt in precise, contextually relevant information, the RAG-based prompt applied by the single-click interface improves the quality, relevance, and coherence of the AI-generated output, reducing the likelihood of hallucinations and inconsistencies. As a result, the RAG-based prompt applied by the single-click interface significantly enhances computational efficiency by reducing the need for repeated manual input and redundant processing across development teams by ensuring that a change to a particular object is consistent with the overall application.

Further, the RAG-based prompt applied by the single-click interface reduces the number of iterations required to achieve desired results, thereby improving computational and network efficiency when collaborating with generative AI tools. For example, the RAG-based prompt applied by the single-click interface improves computational and network efficiency by minimizing the volume and frequency of data exchanged between client and server by encapsulating the necessary context in a single, well-structured request and minimizing the need for multiple back-and-forth queries or large-scale data transfers, thereby reducing latency and bandwidth consumption.

With reference now to the drawings, FIG. 1 is a block diagram illustrating an exemplary system 100 for a single-click interface for collaboration with generative AI in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a single-click AI collaboration system 104. Each of the user device 102 and the single-click AI collaboration system 104 shown in FIG. 1 can comprise one or more computer devices, such as the computing device 900 of FIG. 9, discussed below. As shown in FIG. 1, the user device 102 and the single-click AI collaboration system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the single-click AI collaboration system 104 could be provided by multiple server devices collectively providing the functionality of the single-click AI collaboration system 104 as described herein. Additionally, other components not shown may also be included within the network environment.

The user device 102 can be a client device on the client side of the system 100, while the single-click AI collaboration system 104 can be on the server side of the system 100. The single-click AI collaboration system 104 can comprise server-side software designed to work in conjunction with client-side software on the user device 102 so as to implement any combination of the features and functionalities discussed in the present disclosure. For instance, the user device 102 can include an application 108 for interacting with the single-click AI collaboration system 104. The application 108 can be, for instance, a web browser or a dedicated application for providing functions, such as those described herein. This division of the system 100 is provided to illustrate one example of a suitable environment, and there is no requirement for each implementation that any combination of the user device 102 and the single-click AI collaboration system 104 remain as separate entities. While the system 100 illustrates a configuration in a networked environment with a separate single-click AI collaboration system 104, it should be understood that other configurations can be employed in which aspects of the various components are combined. For instance, in some aspects, aspects of the single-click AI collaboration system 104 can be implemented in part or in whole by the user device 102. For example, in various embodiments, selection context preprocessing component 110 of single-click AI collaboration system 104 can be on the client side of the system 100 (e.g., user device 102). As another example, in various embodiments, contextual data 120 may be accessed directly by single-click AI collaboration system 104. As yet another example, in various embodiments, contextual data 120 may be accessed from other applications via application 108 and/or single-click AI collaboration system 104.

The user device 102 can comprise any type of computing device capable of use by a user. For example, in one aspect, the user device 102 may be the type of computing device 900 described in relation to FIG. 9 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the single-click AI collaboration system 104 via the user device 102.

The single-click AI collaboration system 104 generally facilitates the automated collaboration with a generative AI tool 114 in response to a single-click, such as a single modifier-click action (e.g., CTRL+click), from a user in application 108 of user device 102. In various embodiments, responsive to the single-click action by the user, the single-click AI collaboration system 104 initiates RAG-based prompt engineering to collaborate with the generative AI tool 114 by constructing a prompt based on (1) local contextual data corresponding to the region of the screen view of application 108 that was selected and (2) global contextual data corresponding to global aspects of the application 108 (e.g., external to the particular region of the screen view of application 108). By utilizing local contextual data corresponding to the region of the screen view that was selected, the generative AI tool 114 can determine what the user desires to modify based on the particular region of the screen view. By utilizing global contextual data corresponding to global aspects of the application 108 outside the particular region of the screen view of application 108, the generative AI tool 114 can ensure that modification to one or more aspects of the application based on the region generated by the generative AI tool 114 is consistent across the application 108.

In various embodiments, the single-click AI collaboration system 104 receives the single-click from the user when the user is developing a gaming environment. For example, application 108 can correspond to a game development environment of a gaming environment. For instance, the gaming environment can be a persistent world (such as those of MMORPGs), a session-based instance in a persistent world (such as a raid, player-versus-player arena, or player-versus-environment arena in an MMORPG), or a session-specific instance of a world (such as a battle royale map, real-time strategy map, FPS map, fighting game level, MOBA map, or similar maps). Examples of screen views 500A-500H of a game development environment of a gaming environment in which developers can interact with elements of the gaming environment are shown in FIGS. 5A-5H.

In this regard, when a user selects a region of a game development environment, such as a UI element or a particular area of pixels of the gaming environment, the single-click is automatically interpreted as intent to modify one or more elements of the gaming environment based on the region of the gaming environment using generative AI tool 114. In this regard, local contextual data corresponding to the region of the gaming environment is accessed by the single-click AI collaboration system 104. For example, local contextual data can indicate that the particular UI element corresponds to a description of an NPC. As another example, local contextual data (e.g., text, images, video, and/or the like) indicating that the particular region of pixels corresponds to an area of the gaming environment is accessed. Further, global contextual data for the gaming environment is accessed by the single-click AI collaboration system 104. For example, global contextual data corresponding to each of the NPC's dialogue throughout the game is accessed. As another example, global contextual data corresponding to the game state of the screen view of the gaming environment is accessed. A prompt with the local contextual data, global contextual data, and instructions to generate a modification to elements of the gaming environment based on the region of the gaming environment is applied to the generative AI tool 114 by the single-click AI collaboration system 104. The output of the generative AI tool 114 is validated by the single-click AI collaboration system 104 and applied to the gaming environment (e.g., application 108) in response to the single-click by the user and displayed to the user via user device 102.

As shown in FIG. 1, the single-click AI collaboration system 104 includes a selection context preprocessing component 110, a prompt assembly component 112, a generative AI tool 114, semantic search component 115, machine learning model(s) 116, and a post-processing component 118. The components/modules of the single-click AI collaboration system 104 may be in addition to other components/modules that provide further additional functions beyond the features described herein. The single-click AI collaboration system 104 can be implemented using one or more server devices, one or more platforms with corresponding application programming interfaces, cloud infrastructure, and the like. While the single-click AI collaboration system 104 is shown separate from the user device 102 in the configuration of FIG. 1, it should be understood that in other configurations, some or all of the functions of the single-click AI collaboration system 104 can be provided on the user device 102. Additionally, in some configurations, one or more of the components/modules of the single-click AI collaboration system 104 shown in FIG. 1 can be provided by the user device 102 and/or another location not shown in FIG. 1. The components/modules can be provided by a single entity or multiple entities.

In some aspects, the functions performed by components/modules of the single-click AI collaboration system 104 are associated with one or more applications, services, or routines. In particular, such applications, services, or routines may operate on one or more user devices or servers, may be distributed across one or more user devices and servers, or be implemented in the cloud. Moreover, in some aspects, these components/modules of the single-click AI collaboration system 104 may be distributed across a network, including one or more servers and client devices, in the cloud, and/or may reside on a user device. Moreover, these components/modules, functions performed by these components/modules, or services carried out by these components/modules can be implemented at appropriate abstraction layer(s) such as the operating system layer, application layer, hardware layer, etc., of the computing system(s). Alternatively, or in addition, the functionality of these components/modules and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-Chip systems (SOCs), Complex Programmable Logic Devices (CPLDs), etc. Additionally, although functionality is described herein with regards to specific components/modules shown in example system 100, it is contemplated that in some aspects, functionality of these components/modules can be shared or distributed.

The selection context preprocessing component 110 interprets input selecting a region of a screen view of application 108 as intent to modify elements of application 108 based on the region of the screen view. For example, a single-click action, such as a single modifier-click action (e.g., CTRL+click) initiates single-click AI collaboration system 104. In various embodiments, the region of the screen view that the user intends to modify corresponds to a particular area of pixels of a gaming environment, a particular UI element of the application, such as a UI element of a customer relationship management (CRM) application, or a particular UI element of a game development environment. In one example, the region of the screen view is a particular area of pixels of the gaming environment and the intent to modify an element of application 108 corresponds to adding an additional NPC to the gaming environment. As another example, the region of the screen view is a particular UI element of the gaming environment and the intent to modify an element of application 108 corresponds to changing a description of a character of the gaming environment. As another example, the region of the screen view is a particular UI element of the gaming environment and the intent to modify an element of application 108 corresponds to changing dialogue of a character of the gaming environment. As another example, the region of the screen view is a particular UI element of the gaming environment and the intent to modify an element of application 108 corresponds to changing an appearance of a character of the gaming environment. As another example, the region of the screen view is a particular UI element of the gaming environment and the intent to modify an element of application 108 corresponds to changing data of sub-elements of a UI hierarchy (e.g., the spatial and/or functional relationship of the UI element with respect to other elements, such as data indicating that a particular button is a part of a particular widget which is a part of a particular screen) of the UI element. By changing data of sub-elements of a UI hierarchy, aspects of the gaming environment are updated, such as an appearance of a character of the gaming environment (e.g., as described in further detail with respect to FIGS. 5D-5F).

In various embodiments, selection context preprocessing component 110 interprets input selecting a region of the screen view, such as a particular UI element of application 108, as intent to modify elements of application 108 based on embedded data in the region of the screen view, such as procedures embedded in the particular UI element (e.g., and/or procedures embedded in each of the sub-elements of a UI hierarchy of the particular UI element). For instance, in various embodiments, computing procedures embedded in the region may indicate the intent of the user (e.g., what elements of application 108 the user intends to modify via the single-click action). Further, in various embodiments, computing procedures embedded in the particular region may indicate whether to modify the particular UI element (e.g., or particular sub-element of the UI hierarchy) using the generative AI tool 114, the semantic search component 115, machine learning model(s) 116, and/or combinations thereof. For instance, based on input selecting a region of the screen view, selection context preprocessing component 110 accesses computing procedures embedded in the region that indicate the steps to generate the modification to the element(s), such as by only using generative AI tool 114, only using semantic search component 115, only using machine learning model(s) 116, using semantic search component 115 during preprocessing before using generative AI tool 114, using machine learning model(s) 116 during preprocessing before using generative AI tool 114, using semantic search component 115 during post-processing (via post-processing component 118) after using generative AI tool 114, using machine learning model(s) during post-processing (via post-processing component 118) after using generative AI tool 114, and/or any combinations thereof.

In various embodiments, the selection context preprocessing component 110 accesses local contextual data corresponding to the region of the screen view of application 108 selected by the user from contextual data 120. Further, the selection context preprocessing component 110 accesses global contextual data corresponding to application 108 from contextual data 120. For example, the local contextual data may correspond to a particular element of a gaming environment, such as a UI hierarchy defining an appearance of a particular character, and the global contextual data may correspond to all of the dialogue of the character throughout the game. As another example, the local contextual data may correspond to a particular entry in a CRM application for a customer and the global contextual data may correspond to data from a particular meeting with the customer.

In various embodiments, local contextual data corresponding to a particular selected UI element of application 108 can include local contextual data from each sub-element of the UI hierarchy of the selected UI element. For example, as described in further detail with respect to FIGS. 5D-5F, in various embodiments, a character can be defined by a series of components, such as UI elements. The fields present in the UI elements provide the character definition. Accordingly, the fields can be updated by the models (e.g., generative AI tool 114, semantic search component 115, and/or machine learning model(s) 116) in order to update the appearance of the character. In this regard, in various embodiments, the local contextual data from each sub-element of the UI hierarchy of the selected UI element can include the particular description of the sub-element, and the global contextual data from each sub-element of the UI hierarchy of the selected UI element can include the available options that can be selected for the sub-element. For example, the selected UI element can correspond to the appearance of a particular character, and the sub-element of the UI hierarchy of the selected UI element can correspond to headwear of the particular character. In this regard, the local contextual data corresponds to aspects of the particular character, such as a description of the character, and the global contextual data can correspond to the available headwear options in the gaming environment that can be applied to the character to change the headwear of the character.

In various embodiments, contextual data corresponding to a particular selected UI element of application 108 can include embedded data in the UI element. For example, as described in further detail with respect to FIGS. 5D-5F, in various embodiments, semantic information can include tags describing a particular UI element or a particular field, such as a particular object. An example of the semantic data for an outfit of a character may include semantic tags such as "Medieval, Fantasy" as well as the name of the object, like "Leather Tunic."

In certain embodiments, selection context preprocessing component 110 can determine whether an appropriate response can be accessed locally (e.g., using locally stored contextual data 120) before applying the local contextual data and global contextual data to the prompt assembly component 112. For instance, selection context preprocessing component 110 can be on the client side of the system 100 (e.g., user device 102). In this regard, selection context preprocessing component 110 can access a computing procedure embedded in the region instructing selection context preprocessing component 110 to determine whether there is stored data or procedures in application 108 that can fulfill the request before applying a request over the server for new generated data (e.g., from generative AI tool 114). For example, selection context preprocessing component 110 may interpret input selecting a UI element indicating a character name as intent to modify the character name based on an embedded computing procedure in the UI element. Application 108 may include locally stored names that were previously pre-generated by a large language model (LLM) (e.g., generative AI tool 114). Accordingly, selection context preprocessing component 110 can use the locally stored names that were previously pre-generated instead of calling the LLM to generate new names. However, in certain embodiments, if the locally stored names are unavailable, selection context preprocessing component 110 can apply a request over the server for new generated names (e.g., from generative AI tool 114). In certain embodiments, the semantic search component 115 and/or machine learning model(s) 116 can also be on the client side of the system 100 (e.g., user device 102). In this regard, selection context preprocessing component 110 can determine whether an appropriate response can be accessed locally using the semantic search component 115 and/or machine learning model(s) 116 before applying the local contextual data and global contextual data to the prompt assembly component 112.

The prompt assembly component 112 assembles a RAG-based prompt for generative AI tool 114 using the local contextual data, the global contextual data, and instructions to generate a modification to elements of application 108 based on the region. In various embodiments, the prompt includes weighting applied to the local contextual data and the global contextual data.

The generative AI tool 114 generates a response, such as natural language text to include in the region selected by the user or an image to include in the region selected by the user, based on the RAG-based prompt assembled by the prompt assembly component 112. In various configurations of the technology described herein, the generative AI tool 114 can comprise a multimodal language model (e.g., Large Language Model 800 of FIG. 8) that includes a set of statistical or probabilistic functions to perform natural language processing (NLP) in order to understand, learn, and/or generate human natural language text and code, images, video, and/or the like. For example, a language model can be a tool that determines the probability of a given sequence of words occurring in a sentence, natural language sequence, and/or code. A language model is called a large language model (LLM) when it is trained on enormous amount of data and/or has a large number of parameters. Some examples of LLMs are GOOGLE's Bidirectional Encoder Representations from Transformers (BERT) and OpenAI's GPT-4. These models have capabilities ranging from writing a simple essay to generating complex computer codes-all with limited to no supervision. Accordingly, an LLM can comprise a deep neural network that is very large (e.g., billions to hundreds of billions of parameters) and understands, processes, and produces human natural language and code by being trained on massive amounts of text. These models can predict future words in a sequence letting them, for instance, generate sentences similar to how humans talk and write or otherwise communicate in a form dictated, for instance, by a prompt.

The post-processing component 118 processes the response generated by the generative AI tool 114 in response to the prompt, validates the response, and utilizes the validated response to modify one or more elements of the application 108. In this regard, based on the selection by the user, the generative AI tool 114 is automatically initiated to collaborate with the user. In various embodiments, the post-processing component uses computing procedures to validate the response and/or determine an appropriate modification to the element based on the response from the generative AI tool 114. For example, instructions to generate modifications to elements of application 108 based on the region selected (e.g., as applied by prompt assembly component 112 to generative AI tool 114) may instruct the generative AI tool 114 to provide a number of options, such as three potential objects from a list of available objects or a range of potential values. After receiving the options from the generative AI tool 114, post-processing component 118 can randomly select a particular option to apply as the modification to the element. In various embodiments, the post-processing component uses semantic search component 115 and/or machine learning model(s) 116 to validate the response and/or determine an appropriate modification to the element based on the response from the generative AI tool 114.

In various embodiments, the semantic search component 115 can implement semantic searching in order to modify elements of application 108 based on input selecting a region of the screen view, preprocess available options for the generative AI tool 114, and/or determine the most relevant option from the response generated by the generative AI tool 114. Semantic searching generally refers to computational techniques to evaluate the semantic similarity of text by representing words or phrases as numerical vectors or embeddings. Any known technique can be used to generate the embeddings from text, such as transformer-based models (e.g., Bidirectional Encoder Representations from Transformers [BERT], Sentence-BERT [SBERT], and/or the like) and/or other models, such as Word2Vec. Semantic similarity between embeddings can be measured using any known technique, such as cosine similarity.

In certain embodiments, selection context preprocessing component 110 modifies elements of application 108 based on input selecting a region of the screen view using a semantic search via semantic search component 115. For instance, responsive to a user selecting a region of application 108, selection preprocessing component 110 accesses a procedure to use a semantic search via semantic search component 115 to modify the region. For example, when a user selects a particular object in an object catalog, a semantic search is automatically applied to identify other relevant objects. As a more specific example, responsive to a single modifier-click action of a particular round table object, other tables can be automatically presented using a semantic search (e.g., saving the need of typing or figuring out how to express the desire to see tables).

In certain embodiments, selection context preprocessing component 110 preprocesses available options using a semantic search via semantic search component 115 (e.g., for use by prompt assembly component 112 to prompt the generative AI tool 114). For instance, responsive to a user selecting a region of application 108, selection preprocessing component 110 accesses a procedure to use a semantic search via semantic search component 115 to identify the most relevant available options in order to reduce/filter the number of options provided to the generative AI tool 114 by prompt assembly component 112, thereby reducing the token size of the input prompt and increasing the accuracy of the output of the LLM in certain instances. For example, if a user selects a particular region (e.g., a UI element) that helps with the creation of a quest, vector embeddings can be used to select the quest template semantically close to the user's desired quest. The quest template can then be sent to the LLM (e.g., the generative AI tool 114) by prompt assembly component 112 to fill in the components of the template, such as creating unique characters for that quest.

In certain embodiments, post-processing component 118 processes the response generated by the generative AI tool 114 to identify the most relevant available options (e.g., and/or validate the response from the generative AI tool 114) using a semantic search via semantic search component 115. For instance, responsive to a user selecting a region of application 108, selection preprocessing component 110 accesses a procedure to use a semantic search via semantic search component 115 after generative AI tool 114 provides a response in order to identify the most relevant available options based on the response during post-processing by post-processing component 118. For example, the prompt assembled by prompt assembly component 112 and applied to the generative AI tool 114 can include a list of available options for the generative AI tool 114 to select from. However, in certain instances, the generative AI tool 114 may select from outside those options. Post-processing component 118 can use a semantic search to find the most relevant available option and/or validate the response from the generative AI tool 114. For instance, a vector embedding (e.g., semantic embedding) can be computed from the output of the generative AI tool 114 regarding the proposed modification to the element of application 108 from the generative AI tool 114. Vector embeddings corresponding to the available options for the particular element of application 108 can be computed based on data related to each option, such as the name of the item, description, tags, and/or the like. The most relevant available option can be determined based on a semantic search by semantic search component 115 between the embedding computed from the output of the generative AI tool to the embeddings of the available options. Post-processing component 118 can then utilize the most relevant available option to modify the element instead of the output from the generative AI tool 114.

In various embodiments, machine learning model(s) 116 can implement machine learning techniques in order to modify elements of application 108 based on input selecting a region of the screen view, preprocess available options for the generative AI tool 114, and/or determine the most relevant option from the response generated by the generative AI tool 114. For example, as developers make games using the single-click AI collaboration system 104, overall application context from saved data (e.g., contextual data 120 from various users of application 108) can be used as training data. Machine learning techniques, such as reinforcement learning, can be utilized to determine an appropriate choice (e.g., or range of choices) to modify a particular element of application 108. In certain embodiments, the machine learning model(s) can provide the range as context to the generative AI tool 114. Any known machine learning technique can be used to apply machine learning to modify elements of application 108, preprocess available options for the generative AI tool 114, and/or determine the most relevant option from the response generated by the generative AI tool 114.

In certain embodiments, selection context preprocessing component 110 modifies elements of application 108 based on input selecting a region of the screen view using machine learning techniques via machine learning model(s) 116. For instance, responsive to a user selecting a region of application 108, selection preprocessing component 110 accesses a procedure to use a modification determined by machine learning model(s) 116 to modify the region. For example, a user selects a particular UI element (e.g., or a UI hierarchy that includes the particular UI element) related to a body shape of a character. Machine learning model(s) 116 can be trained on data from prior saved gaming environments to select a random body shape based on machine learning of user normative ranges (e.g., the machine learning model can be trained to not randomize into an overly tall skinny shape that is disproportionate, as historic data shows players do not make use of this character shape). As another example, a user selects a particular region that indicates a procedure to generate a house. A machine learning model can be trained to select a texture for the roof based on historical data.

In certain embodiments, selection context preprocessing component 110 preprocesses available options for use by prompt assembly component 112 to prompt the generative AI tool 114 using machine learning techniques via machine learning model(s) 116. For instance, responsive to a user selecting a region of application 108, selection preprocessing component 110 accesses a procedure to use machine learning model(s) 116 to identify the most relevant available options in order to reduce the number of options provided to the generative AI tool 114 by prompt assembly component 112, thereby reducing the token size of the input prompt and increasing the accuracy of the output of the LLM in certain instances. For example, if a user selects a UI element to change the appearance of a character, instead of providing a list of all "Fantasy" and "Medieval" appearance options to the LLM (e.g., the generative AI tool 114) to choose from, a machine learning model trained on historical data pertaining to what appearance options were chosen can filter out options from the list. The filtered list can then be sent to the LLM (e.g., the generative AI tool 114) by prompt assembly component 112, thereby reducing the token size of the input prompt and increasing the accuracy of the output of the LLM in certain instances.

In certain embodiments, post-processing component 118 processes the response generated by the generative AI tool 114 to identify the most relevant available options (e.g., and/or validate the response from the generative AI tool 114) using machine learning techniques via machine learning model(s) 116. For instance, responsive to a user selecting a region of application 108, selection preprocessing component 110 accesses a procedure to use machine learning model(s) 116 after generative AI tool 114 provides a response in order to identify the most relevant available options based on the response during post-processing by post-processing component 118. Post-processing component 118 can then utilize the most relevant available option to modify the element instead of the output from the generative AI tool 114.

Figure 2:
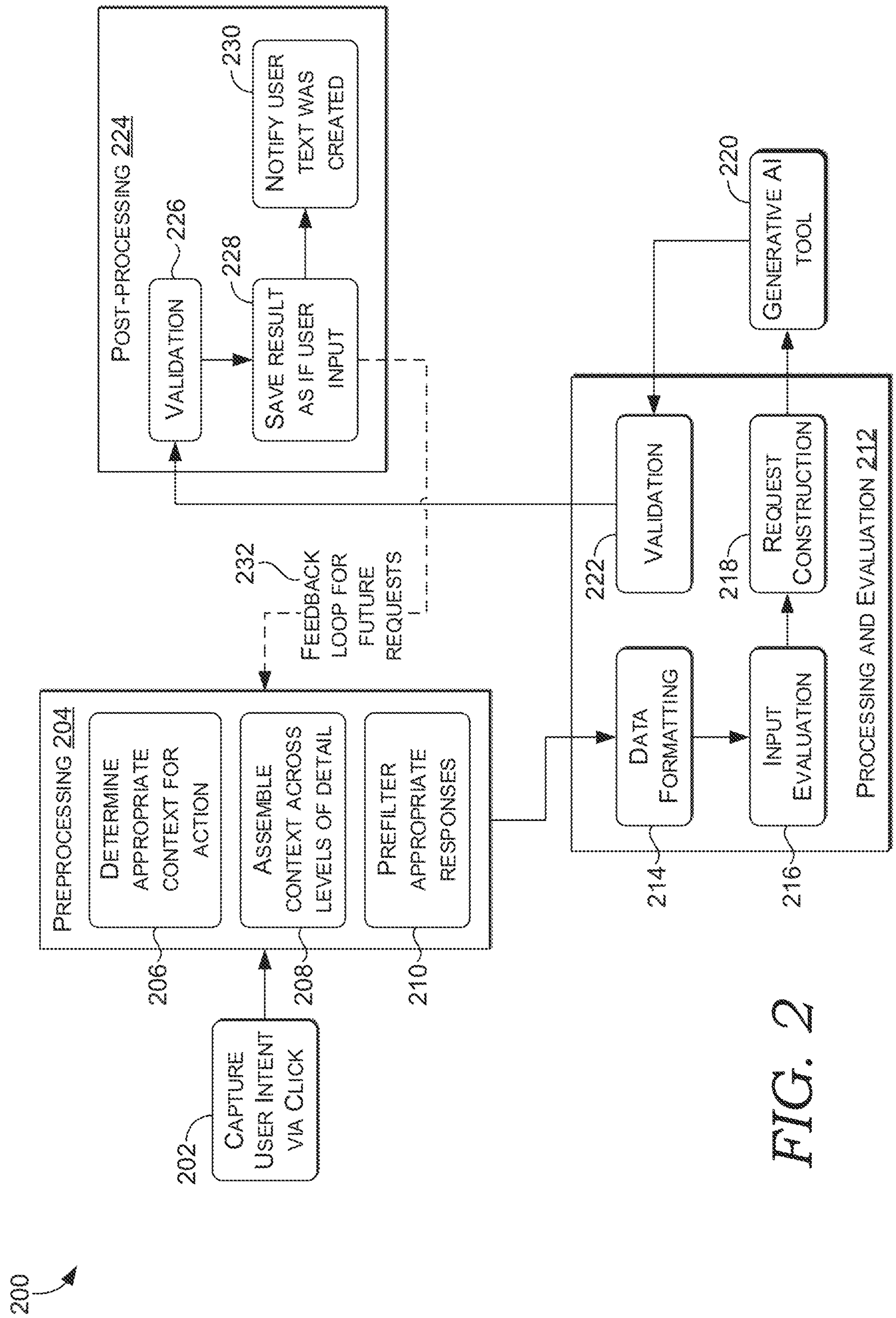
FIG. 2 is a block diagram illustrating an example operation of a single-click interface for collaboration with generative AI, in accordance with aspects hereof.

Turning to FIG. 2, FIG. 2 is a block diagram illustrating an example operation 200 of a single-click interface for collaboration with generative AI. As shown in FIG. 2, at block 202, user intent is captured via a click action (e.g., a single modifier-click action). At block 204, the intent to modify elements of an application based on the particular region selected is preprocessed by determining the appropriate context for the action at block 206, assembling context across various levels of detail (e.g., local contextual data and global contextual data) at block 208, and prefiltering appropriate responses at block 210. At block 212, the preprocessed data corresponding to the user's intent to modify elements of the application based on the region selected is processed and evaluated by formatting the data at block 214, evaluating the input at block 216, requesting construction at block 218, generating a response by the generative AI tool at block 220, and validating the response at block 222. At block 224, the response from the generative AI tool is applied to the application environment by validating the response from the generative AI tool at block 226, saving the result to the application as if it was applied by the user at block 228, and notifying the user that the result was created at block 230. The result can be applied to the contextual layer so that the result can be used as a feedback loop for future requests at block 232.

Figure 3:
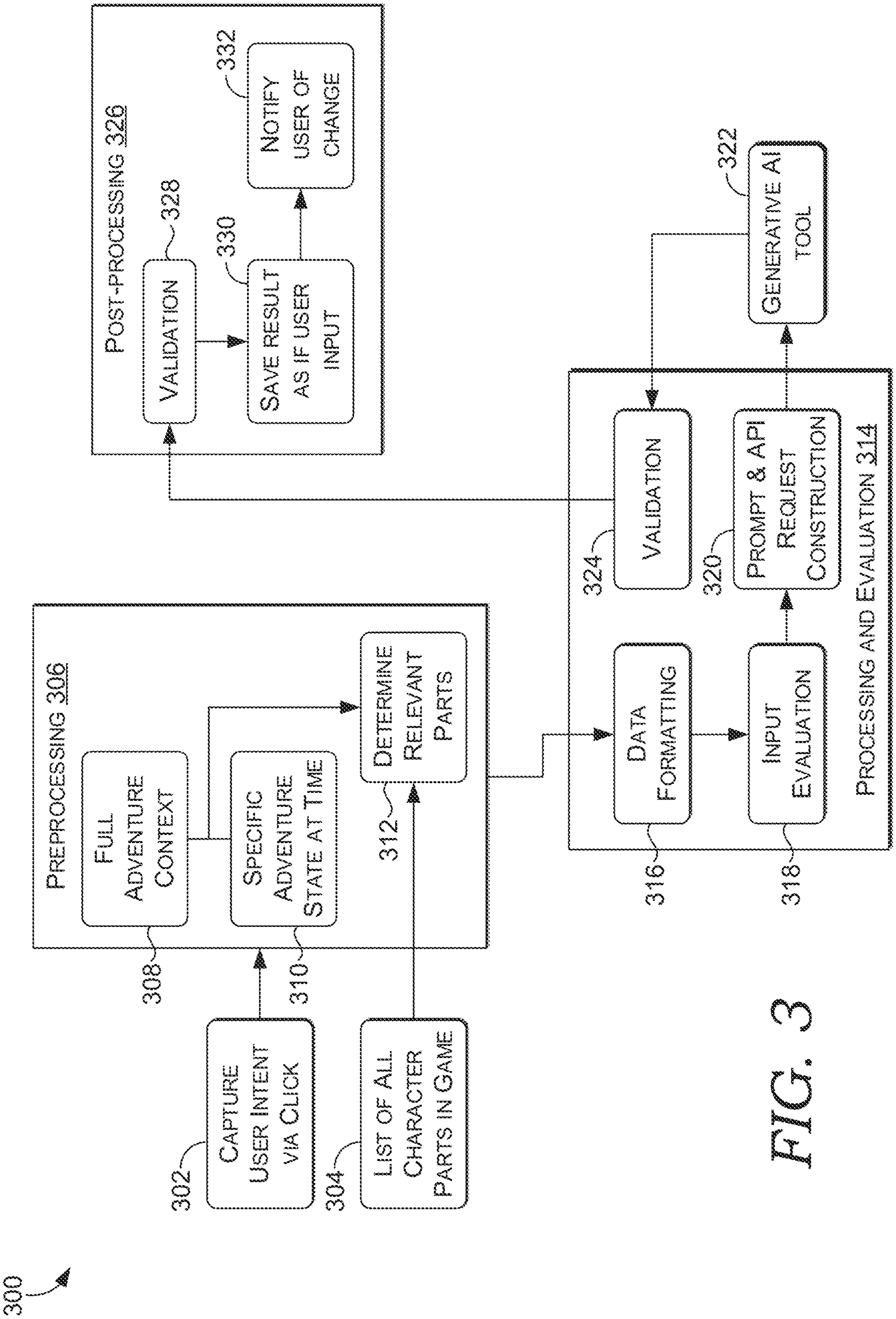
FIG. 3 is a block diagram illustrating an example operation of a single-click interface for collaboration with generative AI in game development environments to change an appearance of a character, in accordance with aspects hereof.

Turning to FIG. 3, FIG. 3 is a block diagram illustrating an example operation 300 of a single-click interface for collaboration with generative AI in game development environments to change an appearance of a character. As shown in FIG. 3, at block 302, user intent to change an appearance of a character is captured via a click action (e.g., a single modifier-click action) selecting a UI element of the game design environment. At block 306, the intent to modify the appearance of the character is preprocessed by determining the full adventure context of the game (e.g., the global contextual data) at block 308, determining the specific adventure context state for the particular game state (e.g., global contextual data) at block 310, and determining the relevant parts of the character (e.g., based on local contextual data indicating the particular character) at block 312 by filtering the relevant parts from a list of all of the character parts in the game accessed at block 304. At block 314, the preprocessed data corresponding to the user's intent to modify the appearance of the character is processed and evaluated by formatting the data at block 316, evaluating the input at block 318, requesting construction at block 320, generating a response by the generative AI tool at block 322, and validating the response at block 324. At block 326, the response from the generative AI tool is applied to the gaming environment by validating the response from the generative AI tool at block 328, saving the change to the appearance of the character throughout the gaming environment as if it was applied by the user at block 330, and notifying the user that the appearance of the character was modified at block 332.

Figure 4:
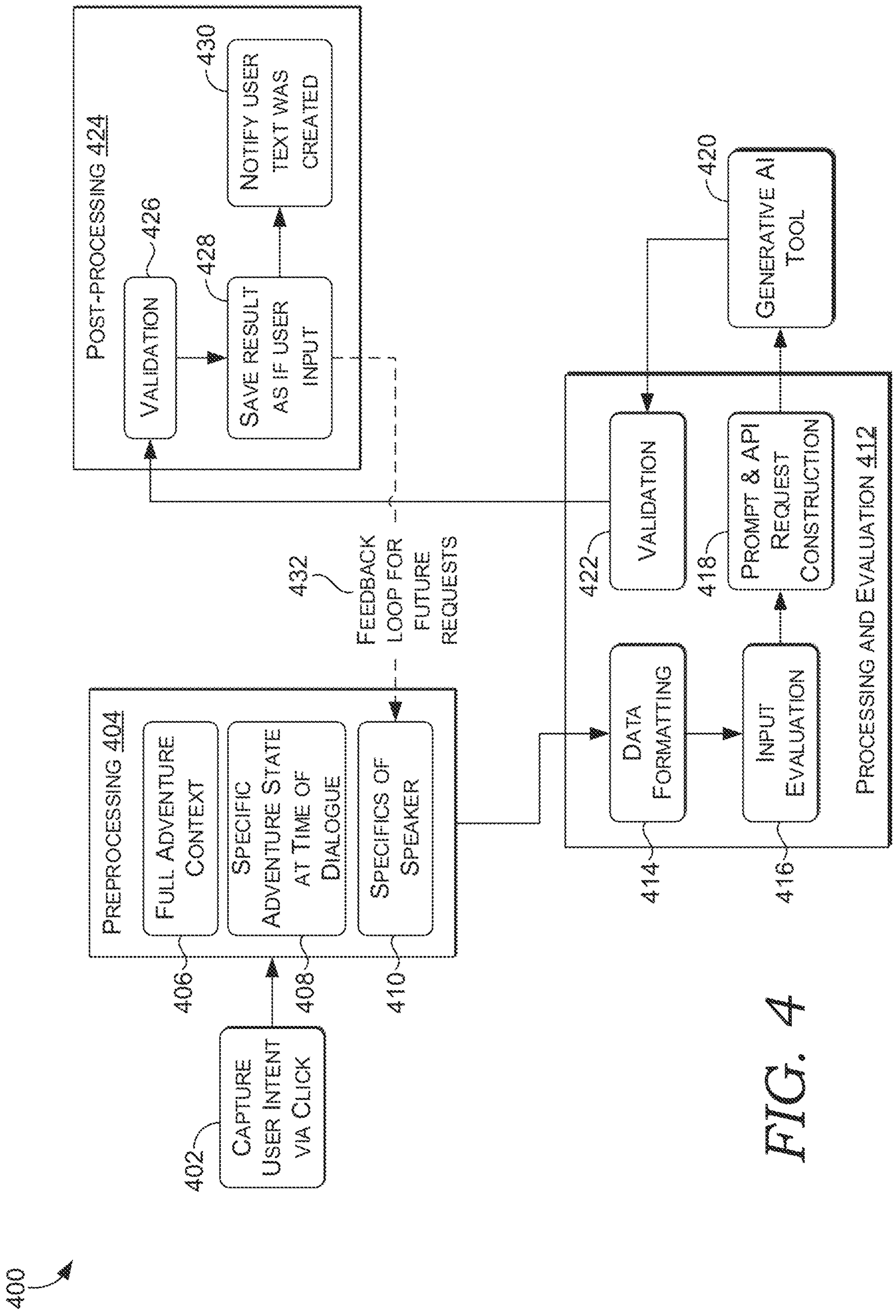
FIG. 4 is a block diagram illustrating an example operation of a single-click interface for collaboration with generative AI in game development environments to generate dialogue for a character, in accordance with aspects hereof.

Turning to FIG. 4, FIG. 4 is a block diagram illustrating an example operation 400 of a single-click interface for collaboration with generative AI in game development environments to generate dialogue for a character. As shown in FIG. 4, at block 402, user intent to generate dialogue for a character is captured via a click action (e.g., a single modifier-click action) selecting a UI element of the game design environment. At block 404, the intent to generate dialogue for the character is preprocessed by determining the full adventure context of the game (e.g., the global contextual data) at block 406, determining the specific adventure context state for the particular game state at the time of the dialogue (e.g., global contextual data) at block 408, and accessing a character description of the character (e.g., based on local contextual data indicating the particular character) at block 410. At block 412, the preprocessed data corresponding to the user's intent to generate dialogue for the character is processed and evaluated by formatting the data at block 414, evaluating the input at block 416, requesting construction at block 418, generating a response by the generative AI tool block 420, and validating the response at block 422. At block 424, the response from the generative AI tool is applied to the gaming environment by validating the response from the generative AI tool at block 426, saving the generated dialogue for the character to the gaming environment as if it was applied by the user at block 428, and notifying the user that the dialogue for the character was modified at block 430. The generated dialogue for the character can be applied to the contextual layer so that the generated dialogue for the character can be used as a feedback loop for future requests at block 432.

Figure 5A:
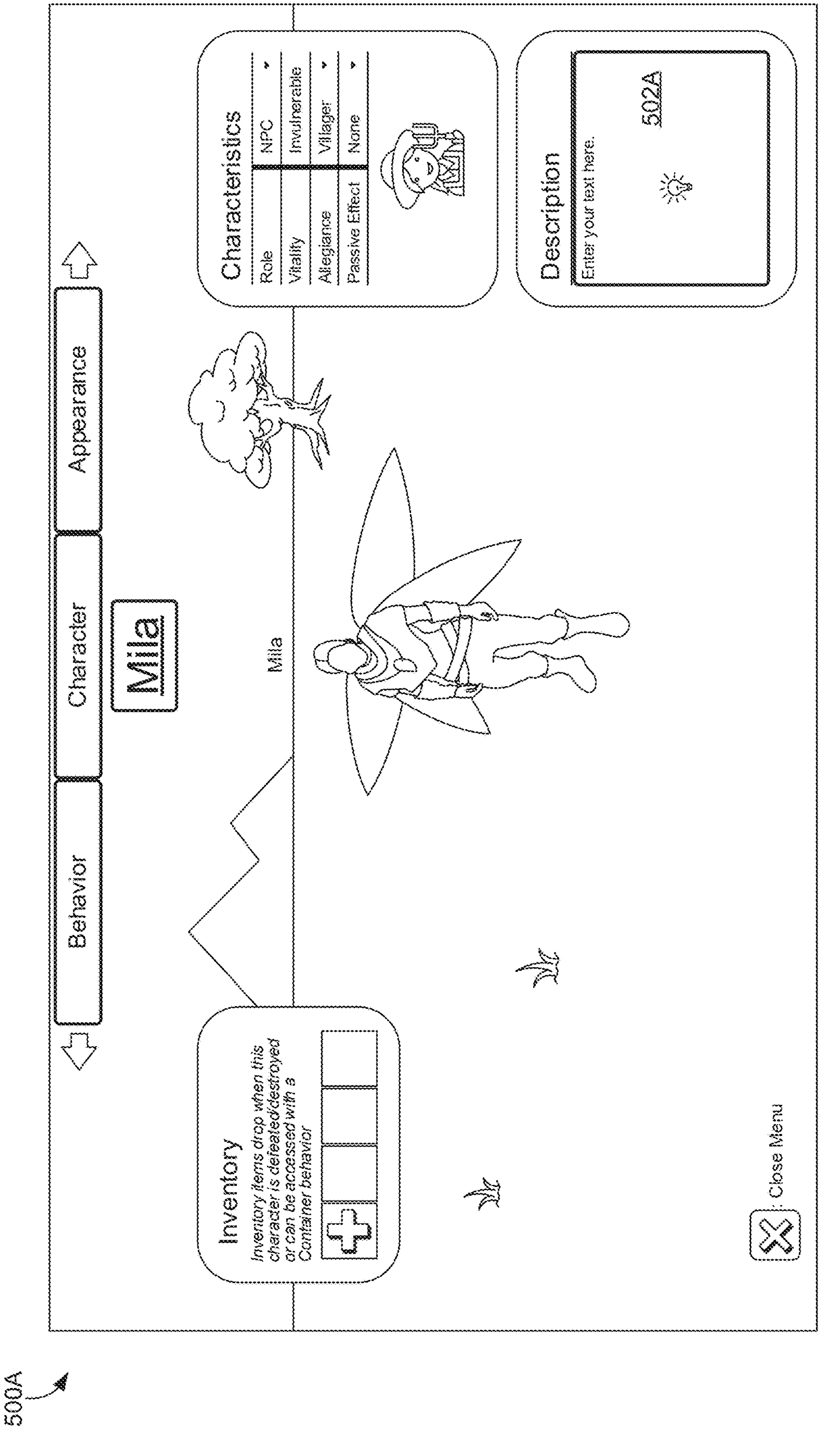
FIGS. 5A-5H depict screen views of a game development environment, in accordance with aspects hereof.

FIGS. 5A-5H depict examples of screen views 500A-500H of a gaming environment corresponding to a game development environment in which developers can interact with elements of the gaming environment. Screen view 500A of FIG. 5A shows an example of a game development environment of a gaming environment. As can be understood from screen view 500A, a user, such as a game developer, applies a single modifier-click action to select the UI element 502A corresponding to the description of the character Mila.

Figure 5B:
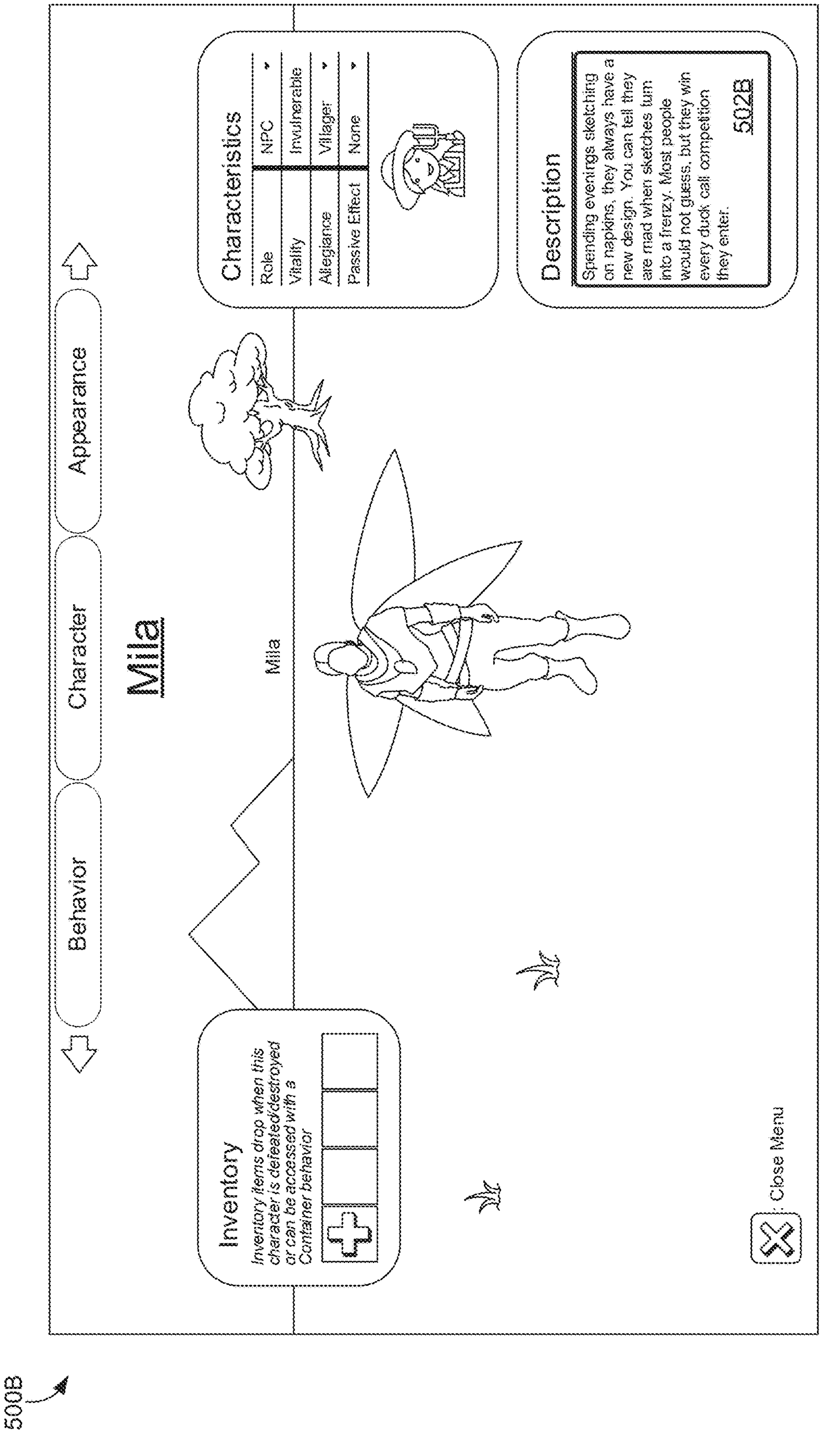

Screen view 500B of FIG. 5B shows an example of a game development environment of a gaming environment after the user applies the single modifier-click action in FIG. 5A. As can be understood from screen view 500B, responsive to the single modifier-click action, the single modifier-click action in FIG. 5A is automatically interpreted (e.g., via single-click AI collaboration system 104 of FIG. 1) as intent to modify the description of the character Mila using a generative AI tool (e.g., generative AI tool 114 of FIG. 1). In this regard, local contextual data corresponding to the character Mila, such as characteristics, behavior, appearance, and/or the like, is accessed. Further, global contextual data for the gaming environment, such as a description of the adventure of the gaming environment, is accessed. A prompt with the local contextual data, global contextual data, and instructions to generate a modification to the description of the character Mila is applied to the generative AI tool. The description of the character Mila 502B output by the generative AI tool is validated and applied to the gaming environment in response to the single modifier-click action by the user. The description of the character Mila 502B is shown to the user in screen view 500B.

Figure 5C:
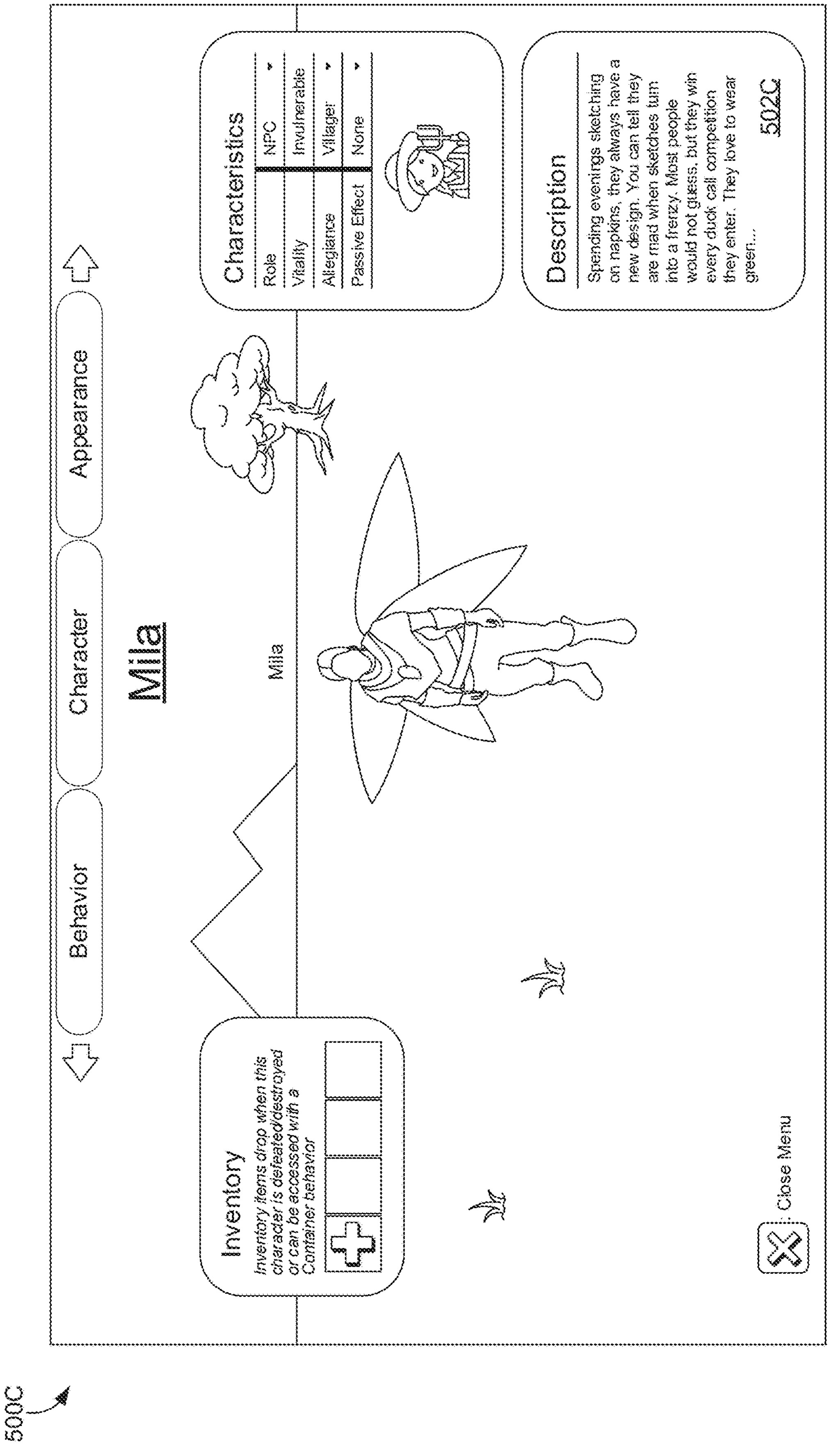

Screen view 500C of FIG. 5C shows an example of a game development environment of a gaming environment after the generated description of the character Mila is applied to the gaming environment in FIG. 5B. As can be understood from screen view 500C, the user can manually edit the description of the character Mila 502C.

Figure 5D:
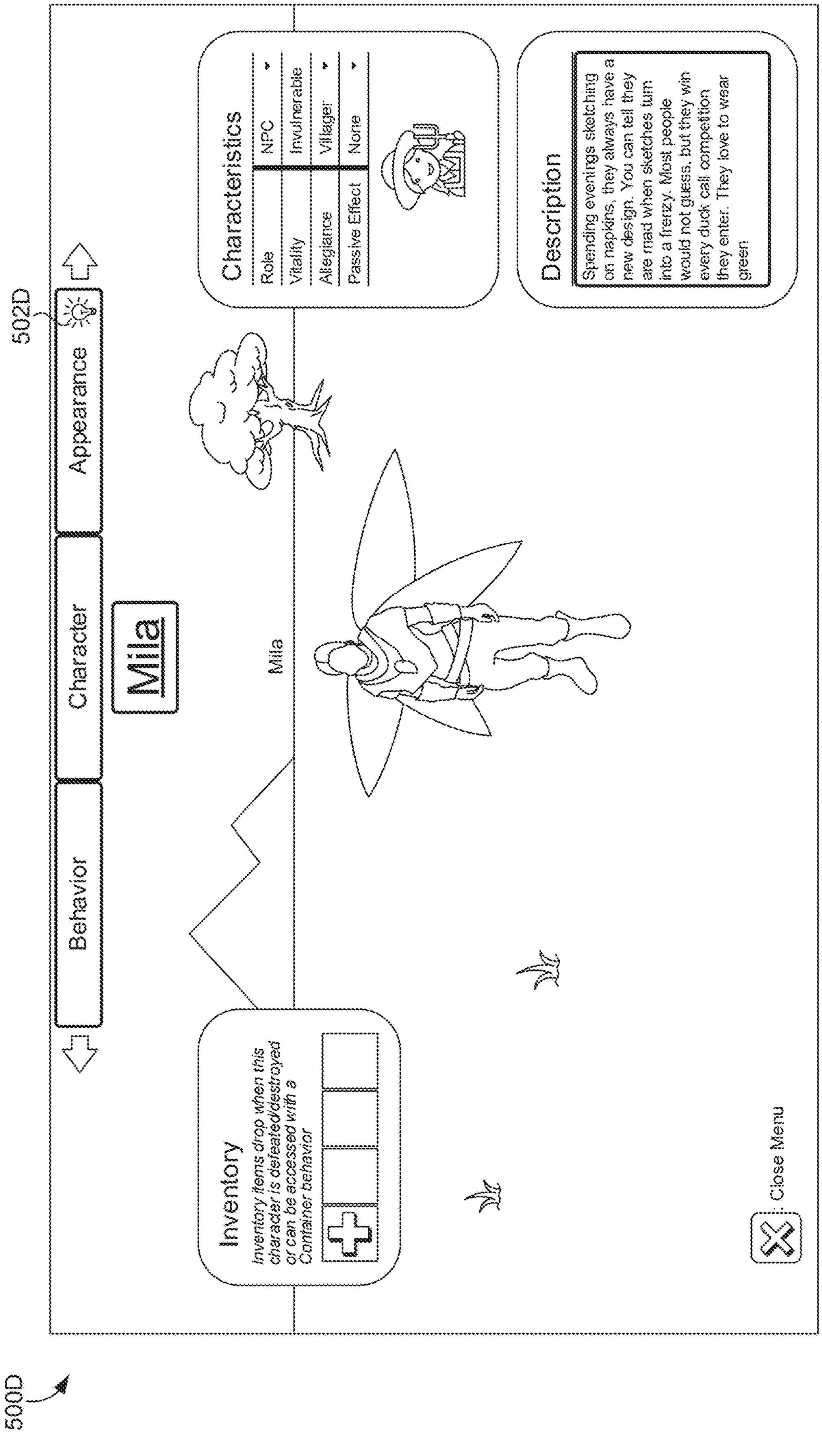

Screen view 500D of FIG. 5D shows an example of a game development environment of a gaming environment. As can be understood from screen view 500D, a user, such as a game developer, applies a single modifier-click action to select the UI element 502D corresponding to the appearance of the character Mila.

Figure 5E:
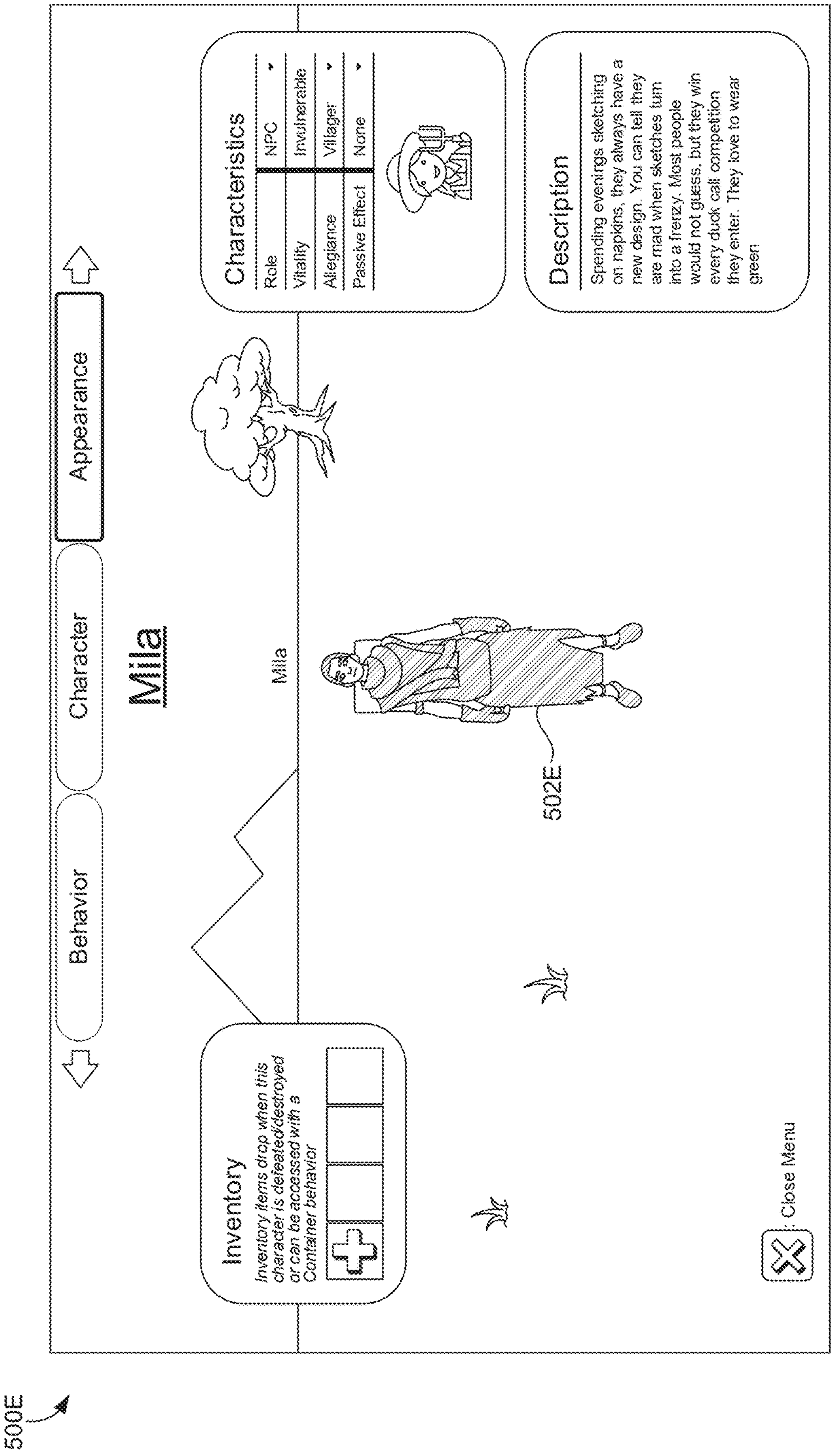
Figure 5F:
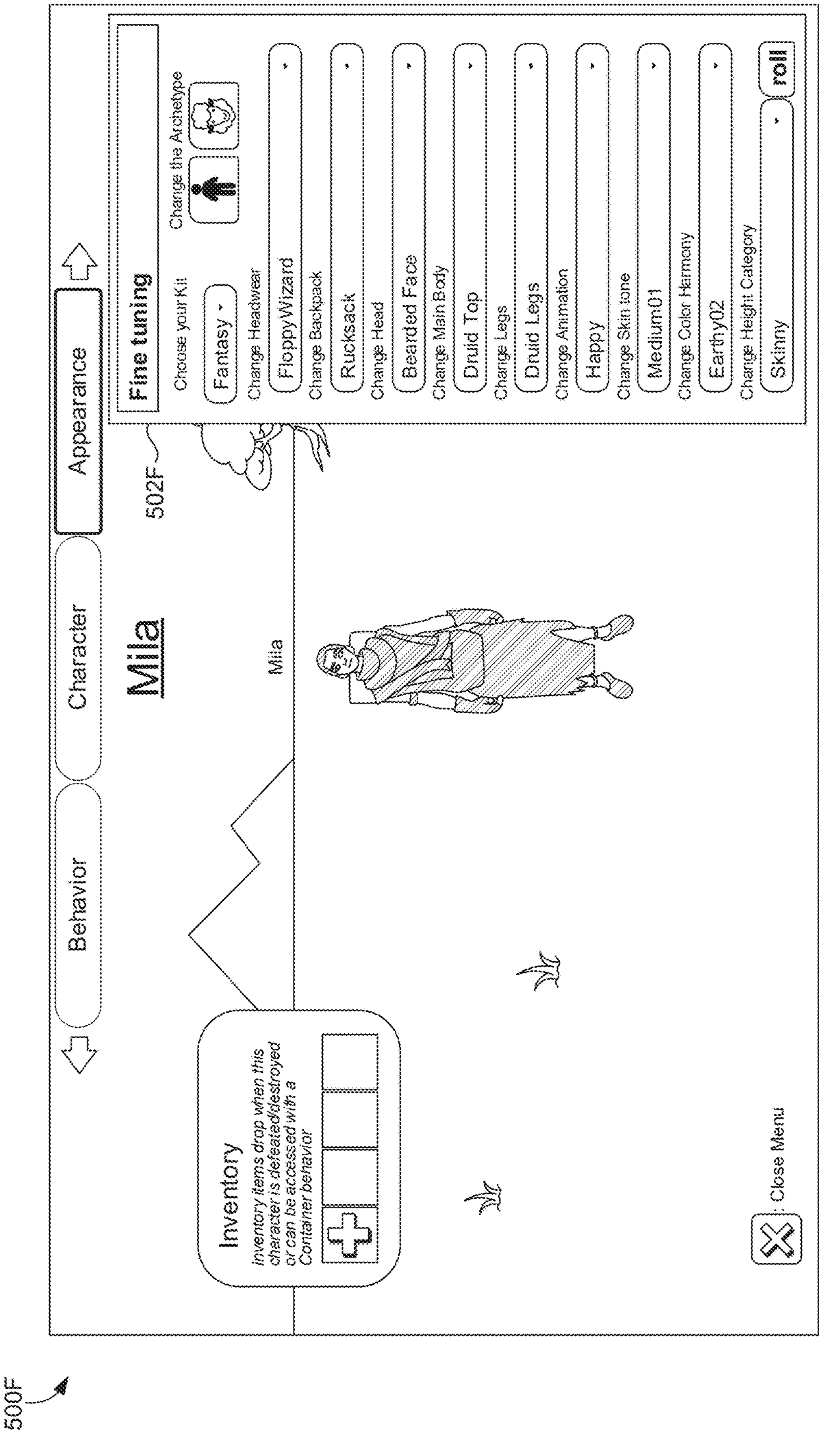

Screen view 500E of FIG. 5E and screen view 500F of FIG. 5F show examples of a game development environment of a gaming environment after the user applies the single modifier-click action in FIG. 5D. As can be understood from screen view 500E, responsive to the single modifier-click action, the single modifier-click action in FIG. 5D is automatically interpreted (e.g., via single-click AI collaboration system 104 of FIG. 1) as intent to modify the appearance of the character Mila using a generative AI tool (e.g., generative AI tool 114 of FIG. 1). In this regard, local contextual data corresponding to the character Mila, such as the description, characteristics, behavior, appearance, and/or the like, is accessed. For example, local contextual data including the description of the character Mila and local contextual data corresponding to UI hierarchy 502F of FIG. 5F indicating the various sub-elements of the UI element of appearance for the character Mila, such as the headware, backpack, head, main body, legs, animation, skin tone, color harmony, height category, and/or the like, are accessed. Global contextual data corresponding to UI hierarchy 502F of FIG. 5F indicating the available options for the various sub-elements is accessed. Further, global contextual data for the gaming environment, such as a description of the adventure of the gaming environment, is accessed. A prompt with the local contextual data, global contextual data, and instructions to generate a modification to the appearance of the character Mila is applied to the generative AI tool. For example, the instructions can instruct the generative AI tool to generate a modification to the UI elements of UI hierarchy 502F of FIG. 5F in order to modify the appearance of the character Mila based on an available list of options for each of the UI elements. The appearance of the character Mila 502E output by the generative AI tool is validated and applied to the gaming environment in response to the single modifier-click action by the user. For example, each UI element (e.g., sub-element) of the UI hierarchy 502F of FIG. 5F corresponding to the appearance of the character Mila output by the generative AI tool is validated and applied to the gaming environment in response to the single modifier-click action by the user. The modified appearance of the character Mila 502E is shown to the user in screen view 500E. For example, the modified appearance of the character Mila (e.g., 502E of FIG. 5E) shown to the user in screen view 500F is based on the modified elements of the UI hierarchy 502F.

Continuing with the example shown in screen views 500D-500F of FIGS. 5D-5F, as can be understood, a character can be defined by a series of components, such as UI elements. The components that define the character include system-level data, such as texture mappings and coloration, and semantic information such as a series of tags describing the item. An example of the semantic data may be tags such as "Medieval, Fantasy" as well as the name of the object, like "Leather Tunic."

As shown in screen view 500F of FIG. 5F, the relevant semantic data can be displayed in the UI. In this regard, users can select individual items per their preference. In various embodiments, the UI does not display all of the semantic data to the user (e.g., the name of the object "Leather Tunic" is displayed, but the tags are not displayed in the UI). In various embodiments, when a user selects the tunic, the character model (e.g., the character Mila 502E of FIG. 5E) would switch to that outfit. In this regard, the fields present in the UI provide the character definition. Thus, the fields can be updated by the models (e.g., generative AI tool 114, semantic search component 115, and/or machine learning model(s) 116) in order to update the appearance of the character.

Continuing with the example shown in screen views 500D-500F of FIGS. 5D-5F, as can be understood, if a user would like assistance in modifying the appearance of the character, the user applies a single modifier-click action on the "Appearance" UI widget (e.g., 502D of FIG. 5D). In this regard, the contextual data corresponding to the overall character definition is collected, such as a superset of the UI hierarchy data of UI hierarchy 502F. Further, in-game context is collected, such as the description as supplied by the player or generated by a previous click (e.g., as described with respect to FIGS. 5A-5C), the overall story context (e.g., the setting [Forest] and genre [Fantasy]), an appropriate subset of all the parts available to select for the character based on context (e.g., all Fantasy parts as well as all Medieval parts like the tunic), the semantic data for the relevant parts (e.g., not just what is visible to the player), and/or the like.

As can be understood from screen views 500D-500F of FIGS. 5D-5F, the request to update the appearance of the character is applied to the single-click AI collaboration system (e.g., single-click AI collaboration system 104) with the context. In various embodiments, the request is applied to a generative AI tool (e.g., an LLM, such as generative AI tool 114) to select an outfit for the character given the context using a customized prompt to constrain selections given the context and obtain a valid result. For example, the request may include instructions to the generative AI tool to select three potential outfits. After receiving the three options from the generative AI tool, post-processing (e.g., post-processing component 118) could select one at random before passing the result downstream. In certain instances, post-processing can select the result at random instead of the generative AI tool due to limitations around reliable randomization from generative AI tools. In another example, the post-processing component may determine whether an identical outfit is worn by another character in the game and automatically select one of the other options.

Continuing with the example shown in screen views 500D-500F of FIGS. 5D-5F, as can be understood, a machine learning model(s) (e.g., machine learning model(s) 116) can be used to provide relevant options to the generative AI tool for one or more of the components of the character definition. For example, as developers make games using the single-click AI collaboration system, overall game context and game data from their saved files can be collected (e.g., in the cloud). From the saved data, reinforcement learning can be utilized to determine an appropriate range of choices for a particular component of a character definition. In certain embodiments, the machine learning model(s) can provide the range as context to the generative AI tool. For example, with respect to body dimensions of a character, most users will select a height within a particular range of height values (e.g., between one meter as a gnome and two meters as an orc). As most generated characters are in this range, a trained machine learning model can automatically select a value in the range and/or provide the range to the generative AI tool as context for the generative AI tool to select a value within the range. For instance, selecting a value of three meters might be valid for a character that represents a giant in other users' games, but would likely violate a user's expectation for their particular games. As a result, the machine learning model can be trained to determine the appropriate range of values for a particular component of the character definition for a particular user. Further, in various embodiments, a user can also manually edit the components of the character definition (e.g., the user can manually alter the height afterwards to convert the character from a gnome height to a giant).

Continuing with the example shown in screen views 500D-500F of FIGS. 5D-5F, as can be understood, vector embeddings (e.g., using semantic search component 115) can be used to select the most relevant available option for one or more components of the character definition based on output from the generative AI tool. For example, the prompt to the generative AI tool can include a list of available options for each UI element of the character definition (e.g., available objects for each UI element of UI hierarchy 502F) for the generative AI tool to select from. However, in certain instances, the generative AI tool may select from outside those options. In various embodiments, during post-processing (e.g., via post-processing component 118), vector embeddings can be used to find the most relevant available option with respect to the output of the generative AI tool (e.g., using semantic search component 115). For example, a vector embedding (e.g., semantic embedding) can be computed from the output of the generative AI tool for the particular component of the character definition. Vector embeddings corresponding to the available options for the particular component of the character definition can be computed based on data related to each option, such as the name of the item, description, tags, and/or the like. The most relevant available option can be determined based on a semantic search between the embedding computed from the output of the generative AI tool to the embeddings of the available options.

Continuing with the example shown in screen views 500D-500F of FIGS. 5D-5F, as can be understood, one or more models (e.g., generative AI tool 114, semantic search component 115, and/or machine learning model(s) 116, and/or other models) can be used to modify an element of an application based on a single-click. For example, if the single modifier-click was done on the "Character" tab in the interface, the UI hierarchy of the "Character" tab can cause the generation of behaviors, a new name, a description, and an appearance, as they are all subfields of the "Character" tab. For instance, as a part of the behaviors, the ability for the character to have dialogue with the player can be generated. In certain embodiments, an AI text-to-speech (TTS) model can be used to generate a voice-over for the created dialogue. In various embodiments, with respect to the name, the name would be selected from contextually relevant LLM-generated options that can be bulk generated outside of the gaming environment, post processed, and then included in the gaming environment. As can be understood, in various embodiments, any number of models (e.g., generative AI tool 114, semantic search component 115, and/or machine learning model(s) 116, and/or other models) can be used to modify various elements of an application based on a single-click of a particular element. As can be further understood, the generation using one or more models (e.g., generative AI tool 114, semantic search component 115, and/or machine learning model(s) 116, and/or other models) can occur locally on the user's machine and/or on a cloud server.

Continuing with the example shown in screen views 500D-500F of FIGS. 5D-5F, as can be understood, after generation, post-processing applies the result to the interface and all of the UI sub-elements in the UI hierarchy 502F of FIG. 5F. In various embodiments, the user can alter the result (e.g., change the height of the character to the desired height). As each UI field of each sub-element is updated (e.g., via a single modifier-click or manually), the appearance of the character in the game is changed accordingly.

Figure 5G:
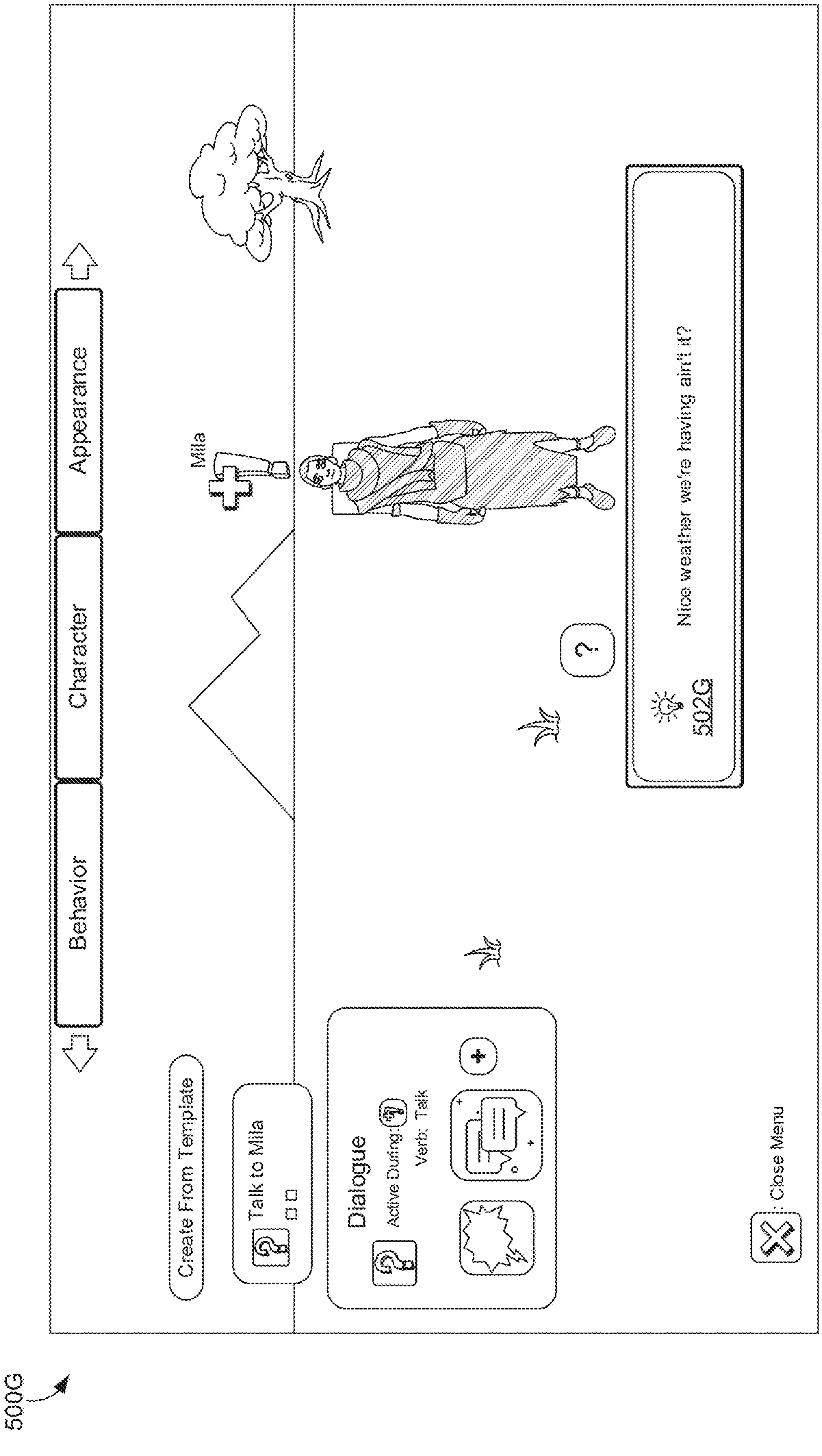

Referring now to FIG. 5G, screen view 500G of FIG. 5G shows an example of a game development environment of a gaming environment. As can be understood from screen view 500G, a user, such as a game developer, applies a single modifier-click action to select the UI element 502G corresponding to the dialogue of the character Mila.

Figure 5H:
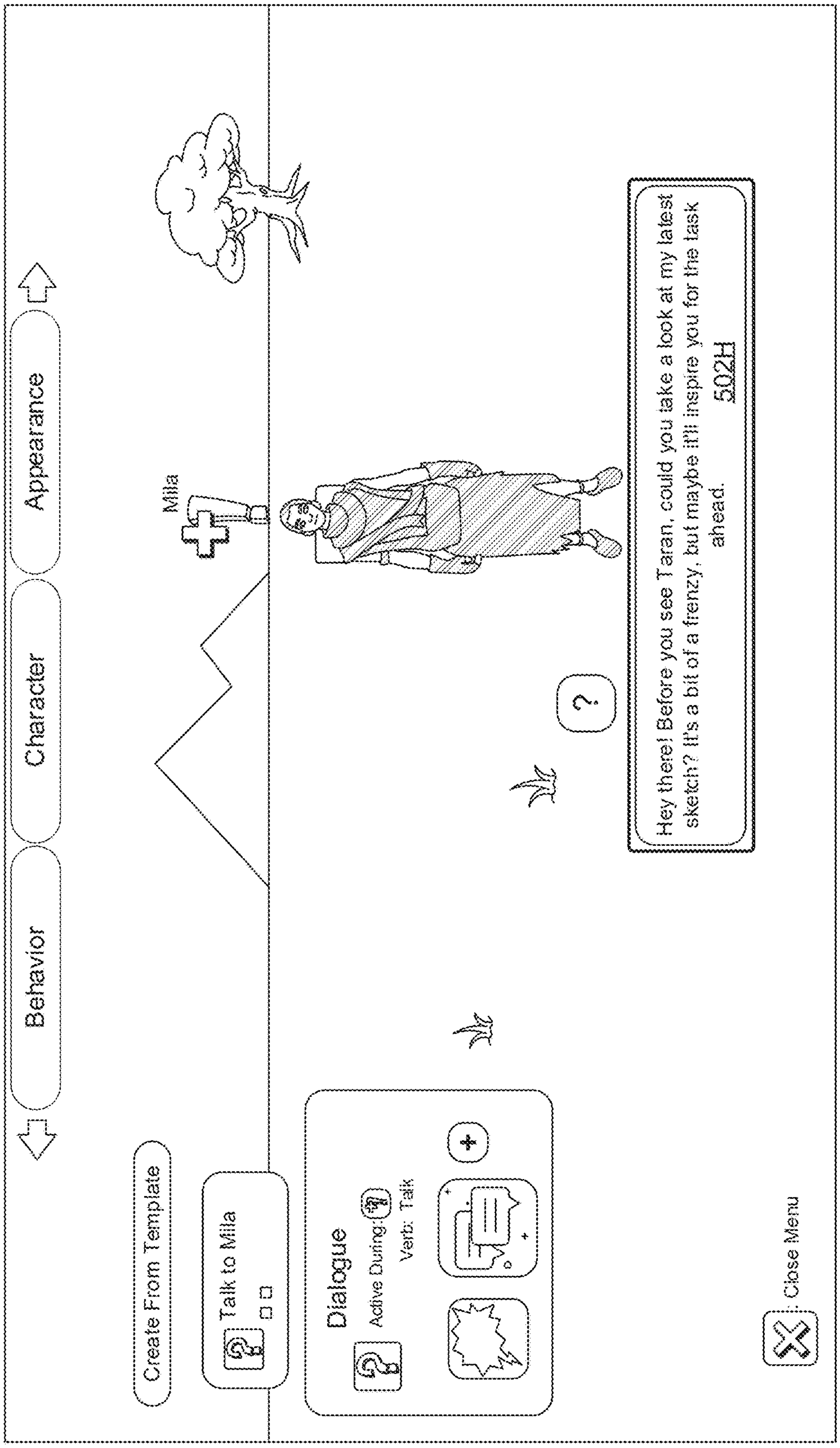

Screen view 500H of FIG. 5H shows an example of a game development environment of a gaming environment after the user applies the single modifier-click action in FIG. 5G. As can be understood from screen view 500H, responsive to the single modifier-click action, the single modifier-click action in FIG. 5G is automatically interpreted (e.g., via single-click AI collaboration system 104 of FIG. 1) as intent to modify the dialogue of the character Mila using a generative AI tool (e.g., generative AI tool 114 of FIG. 1). In this regard, local contextual data corresponding to the character Mila, such as the description, characteristics, behavior, appearance, and/or the like, is accessed. Further, global contextual data for the gaming environment, such as a description of the adventure of the gaming environment, is accessed. A prompt with the local contextual data, global contextual data, and instructions to generate a modification to the dialogue of the character Mila is applied to the generative AI tool. The dialogue of the character Mila 502H output by the generative AI tool is validated and applied to the gaming environment in response to the single modifier-click action by the user. The dialogue of the character Mila 502H is shown to the user in screen view 500H.

Figure 6:
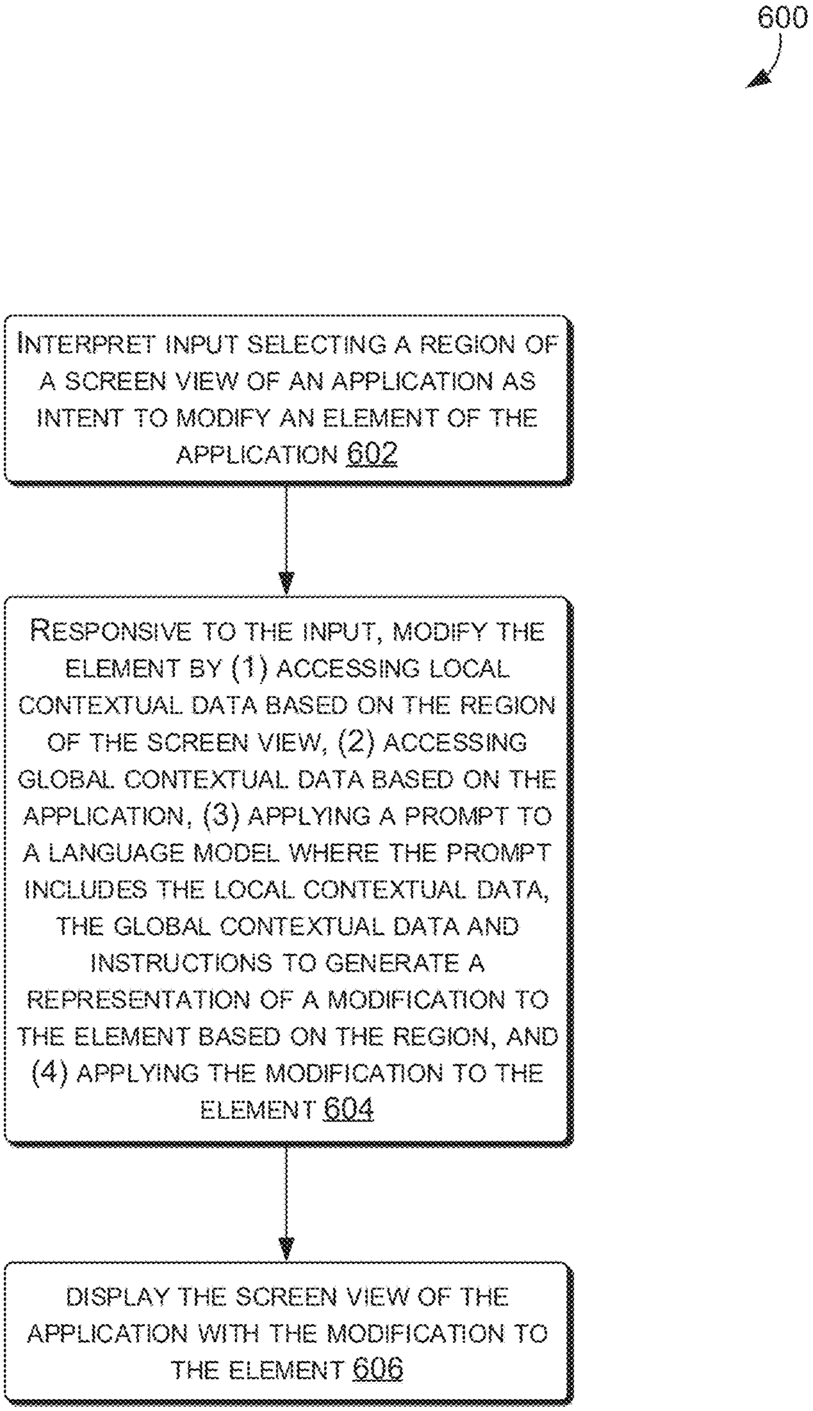
FIG. 6 depicts an example method for a single-click interface for collaboration with generative AI, in accordance with one embodiment.

With reference now to FIG. 6, a flow diagram is provided that illustrates a method 600 for a single-click interface for collaboration with generative AI. The method 600 can be performed, for instance, at least in part by the single-click AI collaboration system 104 in FIG. 1. Each block of the method 600 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, input selecting a region of a screen view of an application is interpreted as intent to modify an element (e.g., one or more elements) of the application based on the region of the screen view. In various embodiments, the input is a single modifier-click action (e.g., CTRL+click). In various embodiments, the region of the screen view is a particular area of pixels of a gaming environment and the application is the gaming environment. In various embodiments, the region of the screen view is a particular UI element of the application, such as a UI element of a CRM application. In various embodiments, the region of the screen view is a particular UI element of a game development environment of a gaming environment, where the element corresponds to a user interface hierarchy of the particular user interface element, and the application is the gaming environment.

At block 604, responsive to the input, the element is modified by (1) accessing local contextual data based on the region of the screen view (e.g., contextual data specific to the particular region of the screen view of the application), (2) accessing global contextual data based on the application (e.g., contextual data outside the particular region of the screen view of the application, such as data corresponding to other elements of the application and/or data from different applications), (3) applying a prompt to a generative language model where the prompt includes the local contextual data, the global contextual data, and instructions to generate a representation of a modification to the element of the application based on the selected region, and (4) applying the modification to the element of the application. For example, the local contextual data may correspond to a particular element of a gaming environment, such as a character, and the global contextual data may correspond to all of the dialogue of the character throughout the game. As another example, the local contextual data may correspond to a particular entry in a CRM application for a customer and the global contextual data may correspond to data from a particular meeting with the customer. In various embodiments, the modification to the element of the application generated by the language model is validated before applying the modification to the element of the application. In various embodiments, the prompt includes weighting applied to the local contextual data and the global contextual data. In various embodiments, available options for the modification to the element are preprocessed to determine a subset of the available options using a machine learning model trained based on prior selections, and the instructions to the generative language model include a request to select from the subset of the available options. In various embodiments, a semantic search is applied between an embedding of the representation of the modification to embeddings of available options for the modification to the element to determine the most relevant option from the available options, where the modification to the element corresponds to the most relevant option from the available options.

At block 606, the screen view is displayed with the modification to the element of the application. In this regard, based on the selection by the user, the generative AI is automatically initiated to collaborate with the user.

Figure 7:
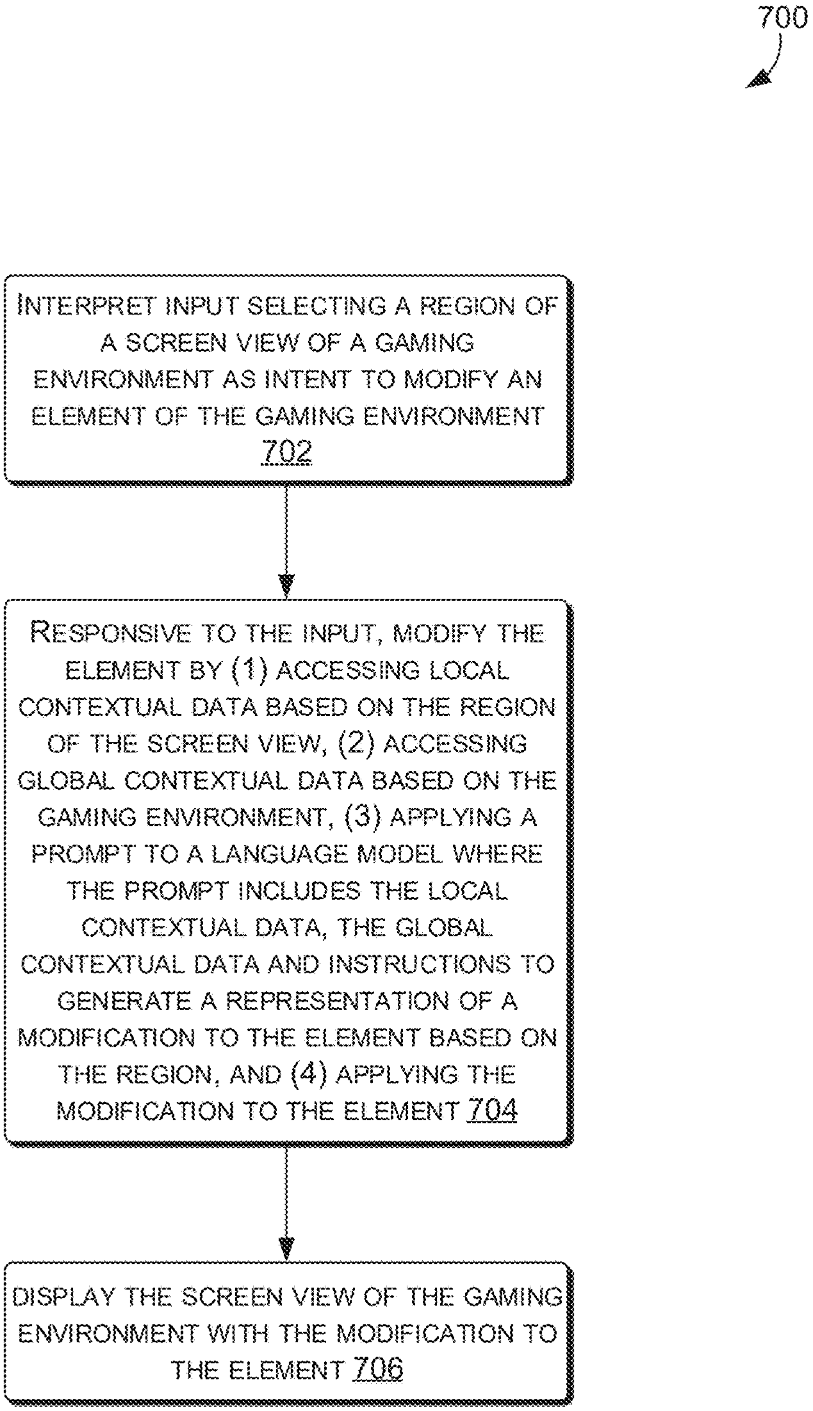
FIG. 7 depicts an example method for a single-click interface for collaboration with generative AI in game development environments, in accordance with one embodiment.

FIG. 7 is a flow diagram illustrating a method 700 for a single-click interface for collaboration with generative AI in game development environments. The method 700 can be performed, for instance, at least in part by the single-click AI collaboration system 104 in FIG. 1.

As shown at block 702, input selecting a region of a screen view of a gaming environment is interpreted as intent to modify an element (e.g., one or more elements) of the gaming environment. In various embodiments, the input is a single modifier-click action (e.g., CTRL+click). In various embodiments, the region of the screen view is a particular area of pixels of the gaming environment and the intent to modify the element based on the selected region corresponds to adding an additional NPC to the gaming environment. In various embodiments, the region of the screen view is a particular UI element of a game development environment of the gaming environment and the intent to modify the element based on the selected region corresponds to changing a description of a character of the gaming environment. In various embodiments, the region of the screen view is a particular UI element of a game development environment of the gaming environment and the intent to modify the element based on the selected region corresponds to changing the dialogue of a character of the gaming environment. In various embodiments, the region of the screen view is a particular UI element of a game development environment of the gaming environment and the intent to modify the element based on the selected region corresponds to changing an appearance of a character of the gaming environment by changing a user interface hierarchy corresponding to the appearance of the character.

At block 704, responsive to the input, the element is modified by (1) accessing local contextual data based on the region of the screen view (e.g., contextual data specific to the particular region of the screen view of the gaming environment), (2) accessing global contextual data based on the gaming environment (e.g., contextual data outside the particular region of the screen view of the application, such as data corresponding to other elements of the gaming environment and/or data from different applications), (3) applying a prompt to a generative language model where the prompt includes the local contextual data, the global contextual data, and instructions to generate a representation of a modification to the element of the gaming environment based on the selected region, and (4) applying the modification to the element of the gaming environment. For example, the local contextual data may correspond to a particular element of a gaming environment, such as a character, and the global contextual data may correspond to all of the dialogue of the character throughout the game. In various embodiments, the modification to the element of the gaming environment generated by the language model is validated before applying the modification to the element of the gaming environment. In various embodiments, the prompt includes weighting applied to the local contextual data and the global contextual data. In various embodiments, available options for the modification to the element are preprocessed to determine a subset of the available options using a machine learning model trained based on prior selections, and the instructions to the generative language model include a request to select from the subset of the available options. In various embodiments, a semantic search is applied between an embedding of the representation of the modification to embeddings of available options for the modification to the element to determine the most relevant option from the available options, where the modification to the element corresponds to the most relevant option from the available options.

At block 706, the screen view of the gaming environment is displayed with the modification to the element of the gaming environment. In this regard, based on the selection by the user, the generative AI is automatically initiated to collaborate with the user in the game development environment.

Figure 8:
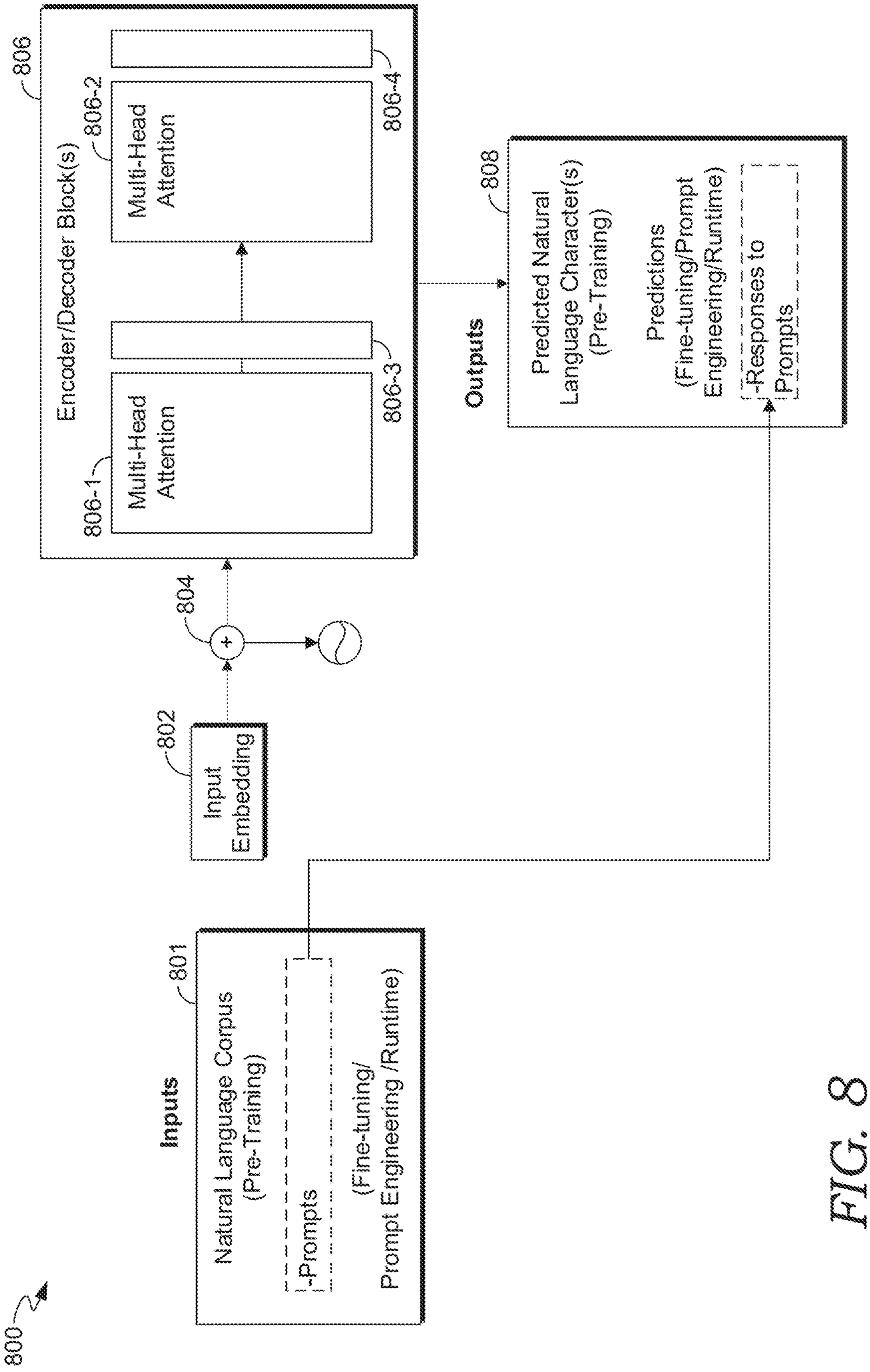
FIG. 8 is a block diagram of a Large Language Model that uses particular inputs to make particular predictions, in accordance with aspects hereof.

FIG. 8 is a block diagram of a Large Language Model 800 (e.g., a BERT model or GPT-4 model) that uses particular inputs to make particular predictions, according to some embodiments. In some embodiments, this model 800 represents or includes the functionality as described with respect to the generative AI tool 114 of FIG. 1. In various embodiments, the language model 800 includes one or more encoders and/or decoder blocks 806 (or any transformer or portion thereof).

First, a natural language corpus (e.g., various WIKIPEDIA English words or BooksCorpus) of the inputs 801 are converted into tokens and then feature vectors and embedded into an input embedding 802 to derive meaning of individual natural language words (for example, English semantics) during pre-training. In some embodiments, to understand English language, corpus documents, such as textbooks, periodicals, blogs, social media feeds, and the like are ingested by the language model 800.

In some embodiments, each word or character in the input(s) 801 is mapped into the input embedding 802 in parallel or at the same time, unlike existing long short-term memory (LSTM) models, for example. The input embedding 802 maps a word to a feature vector representing the word. However, the same word (for example, "apple") in different sentences may have different meanings (for example, brand versus fruit). This is why a positional encoder 804 can be implemented. A positional encoder 804 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sine/cosine function to generate the positional encoder vector as follows:

$$PE_{(pos,2i)} = \sin\left(pos/10000^{2i/d_{model}}\right)$$

$$PE_{(pos,2i+1)} = \cos\left(pos/10000^{2i/d_{model}}\right).$$

After passing the input(s) 801 through the input embedding 802 and applying the positional encoder 804, the output is a word embedding feature vector, which encodes positional information or context based on the positional encoder 804. These word embedding feature vectors are then passed to the encoder and/or decoder block(s) 806, where they go through a multi-head attention layer 806-1 and a feedforward layer 806-2. The multi-head attention layer 806-1 is generally responsible for focusing or processing certain parts of the feature vectors representing specific portions of the input(s) 801 by generating attention vectors. For example, in Question Answering systems, the multi-head attention layer 806-1 determines how relevant the $i^{th}$ word (or particular word in a sentence) is for answering the question or its relevance to other words in the same or other blocks, the output of which is an attention vector. For every word, some embodiments generate an attention vector, which captures contextual relationships between other words in the same sentence or other sequences of characters. For a given word, some embodiments compute a weighted average or otherwise aggregate attention vectors of other words that contain the given word (for example, other words in the same line or block) to compute a final attention vector.

In some embodiments, a single-headed attention has abstract vectors Q, K, and V that extract different components of a particular word. These are used to compute the attention vectors for every word, using the following formula:

$$Z = softmax\left(\frac{Q.K^T}{\sqrt{\text{Dimension of vector } Q, K, \text{ or } V}}\right)\cdot V.$$

For multi-headed attention, there are multiple weight matrices $W^q$, $W^k$, and $W^v$ so there are multiple attention vectors Z for every word. However, a neural network may only expect one attention vector per word. Accordingly, another weighted matrix, $W^z$, is used to make sure the output is still an attention vector per word. In some embodiments, after the layers 806-1 and 806-2, there is some form of normalization (for example, batch normalization and/or layer normalization) performed to smoothen out the loss surface, making it easier to optimize while using larger learning rates.

Layers 806-3 and 806-4 represent residual connection and/or normalization layers where normalization recenters and rescales or normalizes the data across the feature dimensions. The feedforward layer 806-2 is a feedforward neural network that is applied to every one of the attention vectors outputted by the multi-head attention layer 806-1. The feedforward layer 806-2 transforms the attention vectors into a form that can be processed by the next encoder block or can make a prediction at 808. For example, given that a document includes the first natural language sequence "the due date is . . . " the encoder/decoder block(s) 806 predicts that the next natural language sequence will be a specific date or particular words based on past documents that include language identical or similar to the first natural language sequence.

In some embodiments, the encoder/decoder block(s) 806 includes pre-training to learn language (pre-training) and make corresponding predictions. In some embodiments, there is no fine-tuning because some embodiments perform prompt engineering, prompt-tuning, or zero-shot learning. "Prompt engineering" refers to a process of designing or using structured input to the model (referred to as a prompt or prompts) to cause a desired response to be generated by the model. In some embodiments, prompt engineering includes creating the best or optimal prompt, or series of prompts, for the desired user task or output. Accordingly, given a first prompt (which may include target content), if the model produces a first output with a high likelihood of not being the correct response, particular embodiments learn such that a second output (indicative of high likelihood of being the correct response) is always produced when such a first prompt is provided as input. In this way, at model deployment time, no output is ever produced with a low likelihood of being the correct response if the first prompt (or variation thereof) is provided, thereby increasing the accuracy of the model's generative outputs.

Pre-training is performed to understand language, and fine-tuning is performed to learn a specific task, such as learning an answer to a set of questions (in Question Answering [QA] systems). In some embodiments, the encoder/decoder block(s) 806 learns what language and context for a word are in pre-training by training on two unsupervised tasks (MLM and NSP) simultaneously or at the same time. In terms of the inputs and outputs, at pre-training, the natural language corpus of the inputs 801 may be various historical documents, such as text books, journals, or periodicals, in order to output the predicted natural language characters in 808 (not make the predictions at runtime or prompt engineering at this point). The encoder/decoder block(s) 806 takes in a sentence, paragraph, or sequence (for example, included in the input[s] 801), with random words being replaced with masks. The goal is to output the value or meaning of the masked tokens. For example, if a line reads, "please [MASK] this document promptly," the prediction for the "mask" value is "send." This helps the encoder/decoder block(s) 806 understand the bidirectional context in a sentence, paragraph, or line at a document. In the case of NSP, the encoder/decoder block(s) 806 takes, as input, two or more elements, such as sentences, lines, or paragraphs, and determines, for example, if a second sentence in a document actually follows (for example, is directly below) a first sentence in the document. This helps the encoder/decoder block(s) 806 understand the context across all the elements of a document, not just within a single element. Using both of these together, the encoder/decoder block(s) 806 derives a good understanding of natural language.

In some embodiments, during pre-training, the input to the encoder/decoder block(s) 806 is a set (for example, 2) of masked sentences (sentences for which there are one or more masks), which could alternatively be partial strings or paragraphs. In some embodiments, each word is represented as a token, and some of the tokens are masked. Each token is then converted into a word embedding (for example, 802). At the output side is the binary output for the next sentence prediction. For example, this component may output 1, for example, if masked sentence 2 follows (for example, is directly beneath) masked sentence 1. The output is word feature vectors that correspond to the outputs for the machine learning model functionality. Thus, the number of word feature vectors that are input is the same number of word feature vectors that are output.

In some embodiments, the initial embedding (for example, the input embedding 802) is constructed from three vectors: the token embeddings, the segment or context question embeddings, and the position embeddings. In some embodiments, the following functionality occurs in the pre-training phase. The token embeddings are the pre-trained embeddings. The segment embeddings are the sentence numbers (including the input[s] 601) that are encoded into a vector (for example, first sentence, second sentence, etc., assuming a top-down and right-to-left approach). The position embeddings are vectors that represent the position of a particular word in such a sentence that can be produced by positional encoder 804. When these three embeddings are added or concatenated together, an embedding vector is generated that is used as input into the encoder/decoder block(s) 806. The segment and position embeddings are used for temporal ordering since all of the vectors are fed into the encoder/decoder block(s) 806 simultaneously and language models need some sort of order preserved.

In pre-training, the output is typically a binary value C (for NSP) and various word vectors (for MLM). With training, a loss (for example, cross-entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, once pre-training is performed, the encoder/decoder block(s) 806 performs prompt engineering or fine-tuning on a variety of question and answer datasets by converting different QA formats into a unified sequence-to-sequence format. For example, some embodiments perform the QA task by adding a new question answering head or encoder/decoder block, just the way a masked language model head is added (in pre-training) for performing an MLM task, except that the task is a part of prompt engineering or fine-tuning. This includes the encoder/decoder block(s) 806 processing the inputs 801 (e.g., prompts, and/or any other input data) in order to make the predictions and confidence scores as indicated in 808. Prompt engineering, in some embodiments, is the process of crafting and optimizing text prompts for language models to achieve desired outputs. In other words, prompt engineering is the process of mapping prompts (e.g., a question) to the output (e.g., an answer) that it belongs to for training. For example, if a user asks a model to generate a poem about a person fishing on a lake, the expectation is that it will generate a different poem each time. Users may then label the output or answers from best to worst. Such labels are an input to the model to make sure the model is giving more human-like or best answers, while trying to minimize the worst answers (e.g., via reinforcement learning). In some embodiments, a "prompt" as described herein includes one or more of: a request (e.g., a question or instruction [e.g., write a poem]), target content, a command or instruction, and/or more examples (e.g., one-shot or two-shot examples).

In an illustrative example, in some embodiments, the predictions of the output 808 may be generative text, image, video, or other data, such as those described above with reference to FIGS. 1-6. Alternative to prompt engineering or fine-tuning, in some embodiments the inputs 801 and outputs 808 represent "runtime" inputs and outputs. Runtime represents a time after which the model 800 has been trained (e.g., via pre-training and/or fine-tuning and/or prompt engineering), tested, and deployed.

An AI system (e.g., generative AI tool 114 of FIG. 1) refers to an artificial intelligence computing environment or architecture that includes the infrastructure and components that support the development, training, and deployment of artificial intelligence models. It provides necessary hardware, software, and frameworks for developers to create and run artificial intelligence applications. An artificial intelligence system may be a cloud-based AI solution that leverages cloud computing infrastructure to develop, train, deploy, and manage AI models and applications. AI models may specifically refer to generative AI models that are designed to generate new data or content that is similar to, or in some cases, entirely different from data they are trained on.

Artificial intelligence systems can include transformer models that are capable of running complex neural language processing tasks. Transformer models—also known as LLMs—have applications in a wide range of industries. An LLM is a trained deep learning model that can recognize, summarize, translate, predict, and generate content using very large datasets. LLMs and other types of generative AI models are associated with a training phase—where a model is taught to learn patterns, relationships, and knowledge from training datasets- and an inference phase, which includes making predictions, classifications, or generating outputs for real-world tasks or queries.

Unlike convolution neural networks (CNNs), which are typically used for image tasks and mostly rely on convolution operations, transformer models are based on simple general matrix multiplication (GEMM) tasks, which can be further broken down to perform a dot product operation on two vectors. While CNN architectures are typically computationally heavy with a relatively small number of parameters, the architecture of transformer models results in the opposite: a very large number of parameters with a fairly small number of operations. The LLM architecture can create challenges in that performance bottlenecks reside in the memory throughput and capacity rather than the compute engine.

Transformer models operate with memory accesses to retrieve a matrix of weights out of memory, together with a vector (either the input vector or partial result from a previous stage of the model), and multiplying the two. This is true for the model's attention sublayers, the FFN (feed-forward network), sublayers, and for the final embedding layer. As vector-matrix multiplication is actually comprised of numerous vector-vector multiplications (dot product), it is fair to say that most memory accesses are used to read two vectors in order to perform a dot product on them. As such, reading out the full vectors is inefficient.

As such, transformer models (also referred to herein as "generative AI models") require computational resources including processors and memory for the training phase and inference phase. The generative AI models operate with different types of processors (e.g., central processing units [CPUs] or graphics processing units [GPUs]) in architectures that include multi-core CPUs or parallel processors including GPUs and tensor processing units (TPUs). Memory can be used to store model parameters and intermediate data for the training phase and the inference phase. Memory requirements may depend on the size and the architecture of the generative AI models. By way of illustration, an LLM can support an inferencing phase that includes using a trained model to make predictions, draw conclusions, or generate output based on input data or patterns learned during the model's training phase. During the inference phase, an LLM can use DRAM (Dynamic Random-Access Memory) to store various components and data for making inferences. LLMs can store their pre-trained model parameters (e.g., weights and biases of the neural network layers) in DRAM, and when a new input is provided for inference, the model accesses these parameters from DRAM to make predictions.

The inference phase can be divided into two stages: a prompt stage and an auto-regressive stage. The prompt stage can include receiving and processing input as a batch of new tokens as part of the same inference. The prompt stage may operate based on a Key-Value (KV) cache technique, where a KV cache is created for tokens in a batch. During the prompt stage, the input is being digested. The auto-regressive state can include using the model to generate the tokens one by one, based on previous tokens, relying on reading the KV cache of previously processed tokens, and adding the data of only new tokens to the KV cache. This auto-regressive stage includes the model generating a response to the input from the prompt stage.

Figure 9:
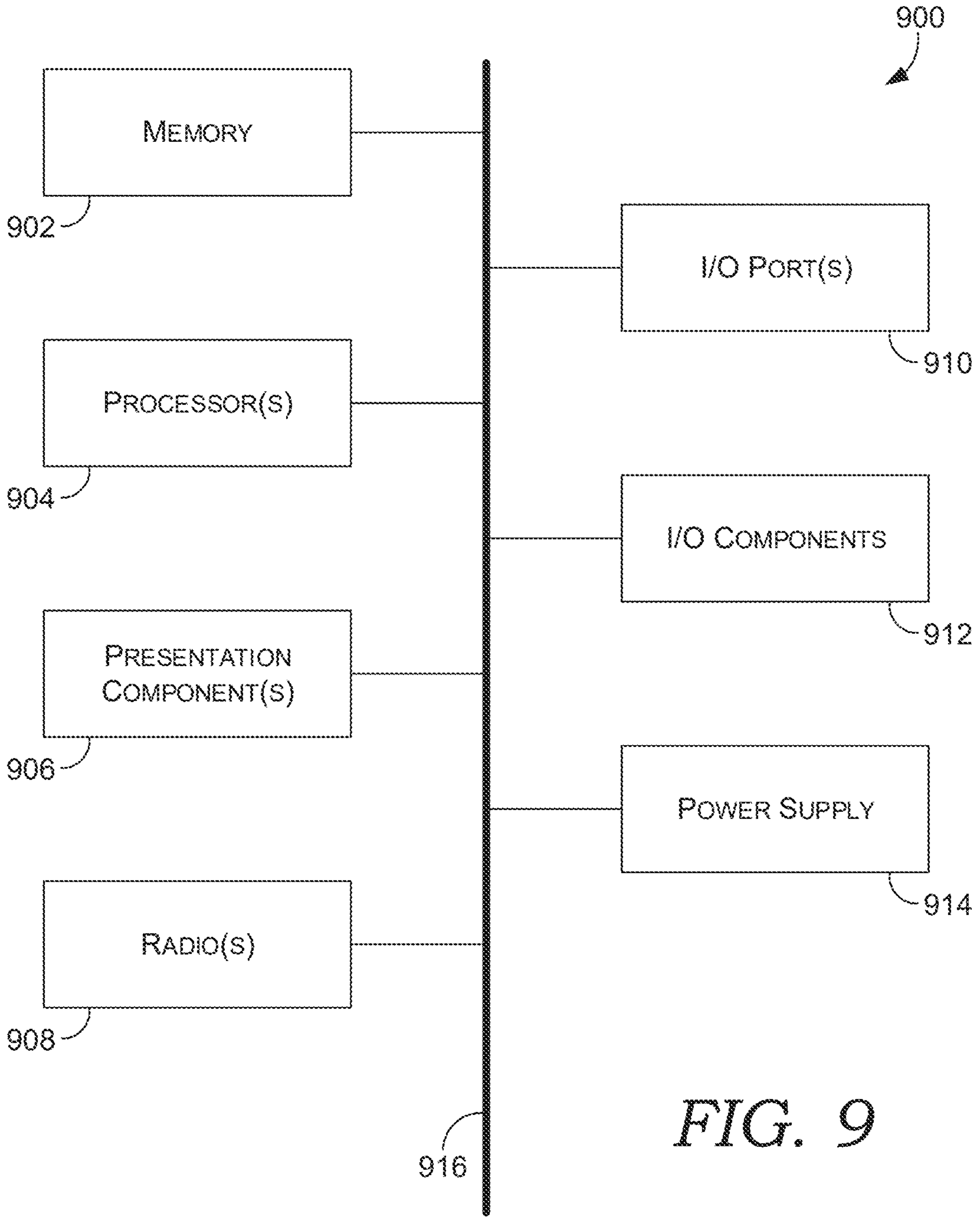
FIG. 9 depicts an example computing device, in accordance with aspects hereof.

With reference to FIG. 9, computing device 900 includes a bus 916 that directly or indirectly couples the following devices: memory 902, one or more processors 904, one or more presentation components 906, input/output (I/O) ports 910, input/output components 912, and an illustrative power supply 914. Bus 916 represents what may be one or more buses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. In addition, processors have memory. The inventors recognize that such is the nature of the art, and reiterates that the diagram of FIG. 9 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and make reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 900. Computer storage media does not comprise transitory signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 902 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 902 or I/O components 912. Presentation component(s) 906 present data indications to a user or other device. Exemplary presentation components include a display device, speaker, printing component, vibrating component, etc.

I/O ports 910 allow computing device 900 to be logically coupled to other devices including I/O components 912, some of which may be built-in. Illustrative components include a microphone, joystick, game pad, satellite dish, scanner, printer, wireless device, etc. The I/O components 912 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radios 908 (or similar wireless communication components). The radio 908 transmits and receives radio or wireless communications. The computing device 900 may be a wireless terminal adapted to receive communications and media over various wireless networks. Computing device 900 may communicate via wireless protocols, such as long-term evolution ("LTE"), code-division multiple access ("CDMA"), global system for mobiles ("GSM"), or time-division multiple access ("TDMA"), as well as others, to communicate with other devices. The radio communications may be a short-range connection, a long-range connection, or a combination of both a short-range and a long-range wireless telecommunications connection. When referring to "short" and "long" types of connections, this does not mean to refer to the spatial relation between two devices. Instead, this is generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth® connection to another computing device is a second example of a short-range connection, or a near-field communication connection. A long-range connection may include a connection using, by way of example and not limitation, one or more of CDMA, LTE, GPRS, GSM, TDMA, and 802.16 protocols.

As can be understood, embodiments of the present disclosure provide for, among other things, systems and methods for a single-click interface for collaboration with generative AI. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that embodiments of the present disclosure are ones well-adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. Non-transitory computer storage media storing executable instructions that when executed by one or more processors cause the one or more processors to perform a method comprising:

responsive to input selecting a region of a screen view of an application, modifying an element of the application based on the region by:

constructing, responsive to the input selecting the region, a textual prompt for a generative language model, the textual prompt comprising local contextual data based on content associated with the region of the screen view, global contextual data based on a state of the application, and instructions to generate a representation of a modification to the element;

applying the textual prompt to the generative language model to generate the representation of the modification; and applying the modification to the element; and causing display of the screen view with the modification to the element.

2. The non-transitory computer storage media of claim 1, wherein the input is a single modifier-click action.

3. The non-transitory computer storage media of claim 1, wherein the region of the screen view corresponds to a particular area of pixels of a gaming environment and the application corresponds to the gaming environment.

4. The non-transitory computer storage media of claim 1, wherein the region of the screen view corresponds to a particular user interface element of the application.

5. The non-transitory computer storage media of claim 1, wherein the region of the screen view corresponds to a particular user interface element of a game development environment of a gaming environment, the element corresponds to a user interface hierarchy of the particular user interface element, and the application corresponds to the gaming environment.

6. The non-transitory computer storage media of claim 1, the method further comprising:

applying a semantic search between an embedding of the representation of the modification to embeddings of available options for the modification to the element to determine a most relevant option from the available options; and wherein the modification to the element corresponds to the most relevant option from the available options.

7. The non-transitory computer storage media of claim 1, the method further comprising:

preprocessing available options for the modification to the element to determine a subset of the available options using a machine learning model trained based on prior selections; and wherein the instructions comprise a request to select from the subset of the available options.

8. A method comprising:

interpreting input selecting a region of a screen view of a gaming environment as intent to modify an element of the gaming environment;

responsive to the input, modifying the element based on the region by:

accessing local contextual data based on content associated with the region of the screen view;

accessing global contextual data based on a state of the gaming environment;

constructing, responsive to the input selecting the region, a textual prompt for a generative language model, the textual prompt comprising the local contextual data, the global contextual data, and instructions to generate a representation of a modification to the element;

applying the textual prompt to the generative language model to generate the representation of the modification; and applying the modification to the region; and causing display of the screen view of the gaming environment with the modification to the element.

9. The method of claim 8, wherein the input is a single modifier-click action.

10. The method of claim 8, wherein the region of the screen view corresponds to a particular area of pixels of the gaming environment and the intent to modify the element corresponds to adding an additional non-player character to the gaming environment.

11. The method of claim 8, wherein the region of the screen view corresponds to a particular user interface element of a game development environment of the gaming environment and the intent to modify the element corresponds to changing a description of a character of the gaming environment.

12. The method of claim 8, wherein the region of the screen view corresponds to a particular user interface element of a game development environment of the gaming environment and the intent to modify the element corresponds to changing dialogue of a character of the gaming environment.

13. The method of claim 8, wherein the region of the screen view corresponds to a particular user interface element of the gaming environment and the intent to modify the element corresponds to changing an appearance of a character of the gaming environment by changing a user interface hierarchy corresponding to the appearance of the character.

14. The method of claim 8, further comprising:

applying a semantic search between an embedding of the representation of the modification to embeddings of available options for the modification to the element to determine a most relevant option from the available options; and wherein the modification to the element corresponds to the most relevant option from the available options.

15. The method of claim 8, further comprising:

preprocessing available options for the modification to the element to determine a subset of the available options using a machine learning model trained based on prior selections; and wherein the instructions comprise a request to select from the subset of the available options.

16. A system comprising:

one or more processors; and non-transitory computer storage media storing executable instructions that when executed by the one or more processors cause the one or more processors to perform a method comprising:

responsive to receiving a single modifier-click action selecting a region of a screen view of an application, modifying an element of the application based on the region by:

accessing local contextual data based on content associated with the region of the screen view;

accessing global contextual data based on a state of the application;

constructing, responsive to the single modifier-click action selecting the region, a textual prompt for a generative language model, the textual prompt comprising the local contextual data, the global contextual data, and instructions to generate a representation of a modification to the element;

applying the textual prompt to the generative language model to generate the representation of the modification; and applying the modification to the element; and causing display of the screen view with the modification to the element.

17. The system of claim 16, wherein the region of the screen view corresponds to a particular area of pixels of a gaming environment and the application is the gaming environment.

18. The system of claim 16, wherein the region of the screen view corresponds to a particular user interface element of the application.

19. The system of claim 16, wherein the region of the screen view corresponds to a particular user interface element of a game development environment of a gaming environment, the element corresponds to a user interface hierarchy of the particular user interface element, and the application corresponds to the gaming environment.

20. The system of claim 16, the method further comprising:

applying a semantic search between an embedding of the representation of the modification to embeddings of available options for the modification to the element to determine a most relevant option from the available options; and wherein the modification to the element corresponds to the most relevant option from the available options.

* * * * *